(12) United States Patent
Zhou et al.

(10) Patent No.: US 12,362,440 B2
(45) Date of Patent: Jul. 15, 2025

(54) PREPARATION METHOD OF CURRENT COLLECTOR ASSEMBLY, CURRENT COLLECTOR ASSEMBLY, BATTERY CELL, AND BATTERY PACK

(71) Applicant: Hithium Tech HK Limited, HongKong (CN)

(72) Inventors: Long Zhou, Fujian (CN); Congmiao Wu, Fujian (CN); Min Guo, Fujian (CN); Jinhua Lan, Fujian (CN)

(73) Assignee: HITHIUM TECH HK LIMITED, HongKong (CN)

( * ) Notice: Subject to any disclaimer, the term of this patent is extended or adjusted under 35 U.S.C. 154(b) by 549 days.

(21) Appl. No.: 17/864,439

(22) Filed: Jul. 14, 2022

(65) Prior Publication Data
US 2023/0014441 A1 Jan. 19, 2023

(30) Foreign Application Priority Data
Jul. 14, 2021 (CN) .......................... 202110798438.9

(51) Int. Cl.
*H01M 50/536* (2021.01)
*H01M 4/64* (2006.01)
(Continued)

(52) U.S. Cl.
CPC ........... *H01M 50/536* (2021.01); *H01M 4/64* (2013.01); *H01M 50/528* (2021.01);
(Continued)

(58) Field of Classification Search
CPC ............. H01M 50/533; H01M 50/534; H01M 50/536; H01M 50/528; H01M 4/64;
(Continued)

(56) References Cited

U.S. PATENT DOCUMENTS

2022/0241890 A1* 8/2022 Yamanaka ............. B23K 20/10

FOREIGN PATENT DOCUMENTS

| CN | 102856578 A | 1/2013 |
|---|---|---|
| CN | 108336282 A | 7/2018 |

(Continued)

OTHER PUBLICATIONS

First Office Action from corresponding Chinese Application No. 202110798438.9, dated Mar. 10, 2023. English translation attached.
(Continued)

*Primary Examiner* — Lingwen R Zeng

(57) ABSTRACT

Provided are a preparation method of a current collector assembly, a current collector assembly, a battery cell, and a battery pack. The preparation method of the current collector assembly includes: abutting the at least one of the connection plate or the protection plate having the protrusion against the plurality of tabs; generating a high-frequency vibration between the at least one of the connection plate or the protection plate having the protrusion and the plurality of tabs; and piercing the plurality of tabs sequentially by the protrusion through the high-frequency vibration. A vibration frequency of the high-frequency vibration ranges from 15 KHz to 40 KHz.

14 Claims, 26 Drawing Sheets

(51) Int. Cl.
*H01M 50/528* (2021.01)
*H01M 50/533* (2021.01)
*H01M 50/534* (2021.01)
*H01M 50/538* (2021.01)
*H01M 50/54* (2021.01)
*H01M 50/55* (2021.01)
*H01M 50/553* (2021.01)
*H01M 50/566* (2021.01)

(52) U.S. Cl.
CPC ........ *H01M 50/533* (2021.01); *H01M 50/534* (2021.01); *H01M 50/538* (2021.01); *H01M 50/54* (2021.01); *H01M 50/55* (2021.01); *H01M 50/553* (2021.01); *H01M 50/566* (2021.01)

(58) Field of Classification Search
CPC .... H01M 50/538; H01M 50/54; H01M 50/55; H01M 50/566; H01M 50/553
See application file for complete search history.

(56) References Cited

FOREIGN PATENT DOCUMENTS

| | | |
|---|---|---|
| CN | 209418631 U | 9/2019 |
| CN | 210956823 U | 7/2020 |
| JP | 2002313309 A | 10/2002 |
| WO | 2012081368 A1 | 6/2012 |
| WO | 2012118127 A1 | 9/2012 |
| WO | 2021101027 A1 | 5/2021 |

OTHER PUBLICATIONS

The Second Office Action from corresponding Chinese Application No. 202110798438.9, dated May 13, 2023. English translation attached.

\* cited by examiner

PREPARATION METHOD OF CURRENT COLLECTOR ASSEMBLY, CURRENT COLLECTOR ASSEMBLY, BATTERY CELL, AND BATTERY PACK

CROSS-REFERENCE TO RELATED APPLICATIONS

The present application is based on and claims priority to Chinese Patent Application No. 202110798438.9, filed on Jul. 14, 2021, the entire content of which is incorporated herein by reference.

TECHNICAL FIELD

The present disclosure relates to the field of battery technologies, and in particular, to a preparation method of a current collector assembly, a current collector assembly, a battery cell, and a battery pack.

BACKGROUND

In the related art, a single-layered tab is welded with copper foils on both sides of a composite tab by means of ultrasonic roll welding. The welded copper foils are welded to a flexible connection. In such a welding method, each layer of tabs needs to be welded, thereby increasing welding costs as well as material costs of the copper foils. After welding, a welded portion is prone to be damaged.

SUMMARY

The present disclosure aims to solve at least one of the technical problems in the related art. To this end, the present disclosure provides a preparation method of a current collector assembly, a current collector assembly, a battery cell, and a battery pack. The preparation method of the current collector assembly is capable of increasing a welding speed and reinforcing welding strength of the current collector assembly.

The present disclosure also provides a current collector assembly.

The present disclosure also provides a battery cell.

The present disclosure also provides a battery pack.

In a first aspect of the present disclosure, a preparation method of a current collector assembly is provided. The current collector assembly includes a current collector including a plurality of tabs stacked in a thickness direction of the plurality of tabs, and a conductive connection assembly including a protection plate and a connection plate. At least one of the protection plate and the connection plate has at least one protrusion formed thereon. The preparation method includes: abutting the connection plate or the protection plate having the at least one protrusion provided thereon against the plurality of tabs; generating a high-frequency vibration between the connection plate or the protection plate having the at least one protrusion provided thereon and the plurality of tabs; and piercing the plurality of tabs sequentially by the at least one protrusion through the high-frequency vibration. A vibration frequency of the high-frequency vibration ranges from 15 KHz to 40 KHz.

With the preparation method of the current collector assembly in the present disclosure, the at least one protrusion can pierce the plurality of tabs by applying the high-frequency vibration to the at least one protrusion and the plurality of tabs. The high-frequency vibration, which acts on a contact surfaces of two objected to be welded, generates a friction between the surfaces of the two objects. Such a manner generates heat to form a fusion between molecular layers. Therefore, a welding speed for the protrusion and the plurality of tabs is increased, and a stable connection between the tabs and a connector can be ensured. In addition, by providing the protection plate for covering the protrusion, it is possible to prevent a top of the protrusion from protruding beyond a protection cover, thereby avoiding damages to the protrusion, and prolonging a service life of the current collector assembly.

In some embodiments, the vibration frequency of the high-frequency vibration is 20 KHz.

In some embodiments, an amplitude of the high-frequency vibration ranges from 5 μm to 100 μm.

In some embodiments, a vibration direction of the high-frequency vibration is parallel to a direction in which the at least one protrusion extends on a surface of a connection plate or on a surface of a protection plate.

In some embodiments, a connection plate or a protection plate has a plurality of protrusions provided thereon. A vibration direction of the high-frequency vibration is parallel to a direction in which the plurality of protrusions is arranged with a maximum density.

In some embodiments, the connection plate or the protection plate having the at least one protrusion provided thereon is abutted against the plurality of tabs by a pressure no less than 20N.

Further, the high-frequency vibration is a vibration generated by ultrasonic welding Further, a welding time of the ultrasonic welding is equal to or longer than 30 ms.

Further, the protection plate is formed in a sheet-like shape. The at least one protrusion is formed on the connection plate. The preparation method also includes, prior to said abutting the connection plate having the at least one protrusion against the plurality of tabs: covering the protection plate on a surface at one side of the plurality of tabs in the thickness direction; and arranging a connector at another side of the plurality of tabs in the thickness direction and positioning the at least one protrusion opposite to the plurality of tabs.

Further, the preparation method also includes, subsequent to said piercing the plurality of tabs sequentially by the at least one protrusion through the high-frequency vibration: connecting the at least one protrusion to an inner surface of the protection plate facing the plurality of tabs or embedding the at least one protrusion within the protection plate through the high-frequency vibration.

Further, the current collector further includes a plurality of electrode plates stacked with each other. Each of the plurality of electrode sheets includes the tab. The tab includes a support insulation layer, and a first conductive layer and a second conductive layer covering surfaces on two sides of the support insulation layer in a thickness direction of the support insulation layer, respectively.

In a second aspect of the present disclosure, a current collector assembly is provided. The current collector assembly is prepared by the preparation method of the current collector assembly as described in the above-mentioned first aspect of the present disclosure.

In the present disclosure, the current collector assembly is prepared by the preparation method of the current collector assembly as described in the above-mentioned first aspect. Thus, it is possible to lower the difficulty of preparing the current collector assembly, and shorten time for fabricating the current collector assembly. In addition, it is also possible to reduce labor costs, and ensure reliability of the current collector assembly.

In a third aspect of the present disclosure, a battery cell includes the current collector assembly as described in the above-mentioned second aspect of the present disclosure.

With the battery cell in the present disclosure, by applying the current collector assembly in the above-mentioned second aspect in the battery cell, the difficulty of assembling the battery cell can be lowered, and time for fabricating the battery cell can be shortened. In addition, it is possible to reduce labor costs, and ensure the reliability of the battery cell.

In a fourth aspect of the present disclosure, a battery pack includes the battery cell as described in the above-mentioned third aspect of the present disclosure.

With the battery pack in the present disclosure, by providing the battery cell as described in the above-mentioned third aspect, it is possible to enhance safety performance of the battery pack, and ensure the reliability of the battery pack, thereby avoiding an occurrence of dangers.

Additional aspects and advantages of the present disclosure will be provided at least in part in the following description, or will become apparent at least in part from the following description, or can be learned from practicing of the present disclosure.

Figure 1:
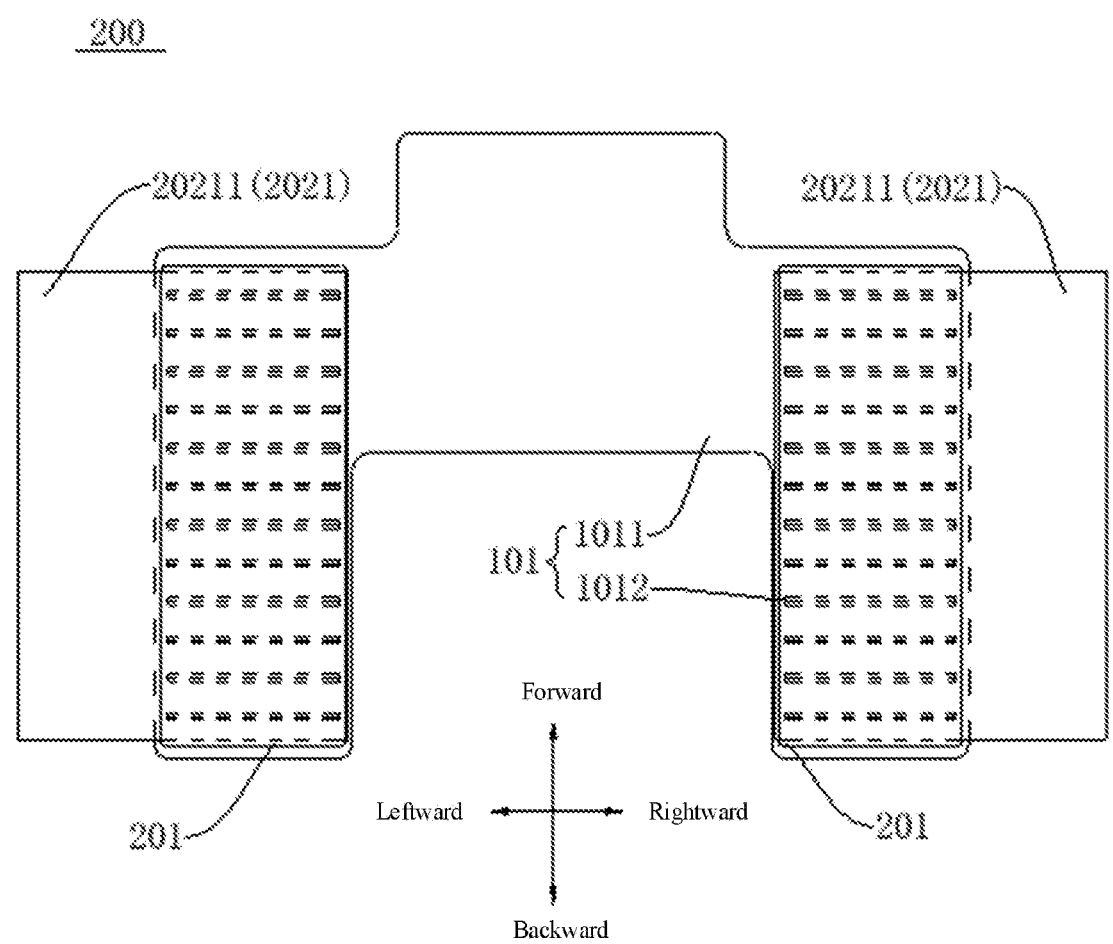
FIG. 1 is a schematic view showing a current collector assembly according to an embodiment in a second aspect of the present disclosure.

REFERENCE NUMERALS conductive connection assembly 100, connector 101, connection plate 1011,
protrusion 1012, connection segment 10121, piercing segment 10122,
first protrusion 31, second protrusion 32,
current collector assembly 200, protection plate 201,
current collector 202, electrode sheet 2021, tab 20211,
first conductive layer 202111, second conductive layer 202112, support insulation layer 202113,
battery cell 1000.

DESCRIPTION OF EMBODIMENTS

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A preparation method of a current collector assembly 200 according to an embodiment in a first aspect of the present disclosure will be described below with reference to FIG. 1 to FIG. 35.

With the preparation method of the current collector assembly 200 according to an embodiment in the first aspect of the present disclosure, the current collector assembly 200 includes a current collector 202 and a conductive connection assembly 100.

Specifically, the current collector assembly 200 includes: a current collector 202 including a plurality of tabs 20211 stacked in a thickness direction of the plurality of tabs 20211; and a conductive connection assembly 100 including a protection plate 201 and a connection plate 1011. At least one of the protection plate 201 or the connection plate 1011 has at least one protrusion 1012 formed thereon. The preparation method includes: abutting the connection plate 1011 or the protection plate 201 having the protrusion 1012 provided thereon against the plurality of tabs 20211; generating a high-frequency vibration between the connection plate 1011 or the protection plate 201 having the protrusion 1012 provided thereon and the plurality of tabs 20211; and piercing the plurality of tabs 20211 sequentially by the protrusion 1012 through the high-frequency vibration. Here, a vibration frequency of the high-frequency vibration ranges from 15 KHz to 40 KHz.

That is, the plurality of tabs 20211 is stacked in the thickness direction thereof. The protection plate 201 is arranged at one side of the plurality of tabs 20211 in the thickness direction. The connection plate 1011 is arranged at another side of the plurality of tabs 20211 in the thickness direction. The protrusion 1012 has one end connected to the connection plate 1011, and penetrates the plurality of tabs 20211 to be electrically connected to the plurality of tabs 20211. Further, the protrusion 1012 has another end located on an inner side of an outer side surface of the protection plate 201. The protrusion 1012 may be formed on the connection plate 1011, or on the protection plate 201, or on both the connection plate 1011 and the protection plate 201.

The current collector assembly 200 is prepared by, firstly, abutting the protrusion 1012 on the connection plate 1011 or the protection plate 201 against the plurality of tabs 20211, then applying a high-frequency vibration between the connection plate 1011 or the protection plate 201 and the plurality of tabs 20211, and finally, piercing the plurality of tabs 20211 by the protrusion 1012 through the high-frequency vibration.

For example, the vibration frequency of the high-frequency vibration may be 15 KHz, 20 KHz, 25 KHz, 30 KHz, 35 KHz, 40 KHz, etc.

With the preparation method of the current collector assembly 200 according to the embodiments of the present disclosure, the protrusion 1012 can pierce the plurality of tabs 20211 by applying the high-frequency vibration between the protrusion 1012 and the plurality of tabs 20211. The high-frequency vibration, which acts on contact surfaces of two object to be welded, generates a friction between the surfaces of the two objects. Such a manner generates heat to form a fusion between molecular layers. Therefore, a welding speed for the protrusion 1012 and the plurality of tabs 20211 can be increased, and a stable connection between the tab 20211 and a connector 101 can be ensured. In addition, by providing the protection plate 201 for covering the protrusion 1012, it is possible to prevent a top of the protrusion 1012 from protruding beyond a protection cover, thereby avoiding damages to the protrusion 1012 and prolonging a service life of the current collector assembly 200.

In some embodiments of the present disclosure, the vibration frequency of the high-frequency vibration is 20 KHz. When the vibration frequency is lower than 20 KHz, welding noises are loud and welding effect is poor.

In some embodiments of the present disclosure, an amplitude of the high-frequency vibration ranges from 5 μm to 100 μm, which may be selected based on a thickness and hardness of the material to be welded. The amplitude of the high-frequency vibration ranging from 5 μm to 100 μm can further improve the welding effect, increase the welding speed, and lower the welding difficulty. For example, the amplitude of the high-frequency vibration may be 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, etc.

In some embodiments of the present disclosure, a vibration direction of the high-frequency vibration is parallel to a direction in which the protrusion 1012 extends on a surface of the connection plate 1011 or on a surface of the protection plate 201. That is, the protrusion 1012 may extend on the surface of the connection plate 1011 or on the surface of the protection plate 201. The extending direction of the protrusion 1012 is parallel to the vibration direction of the high-frequency vibration. The extending direction of the protrusion 1012 is the same as the vibration direction of the high-frequency vibration. Such a manner helps speed up the welding speed for the protrusion 1012 and the plurality of tabs 20211, reduce production time, and improve production efficiency.

Further, the protrusion 1012 is arranged on the connection plate 1011, and penetrates the plurality of tabs 20211 to be connected to the protection plate 201. The protrusion 1012 and the connection plate 1011 may be integrally formed to reduce a number of parts of the current collector assembly 200, and reinforce a connection strength of the entire current collector assembly 200. In addition, it is possible to improve connection stability between the protrusion 1012 and the plurality of tabs 20211, lower a defective rate of the current collector assembly 200, and prolong the service life of the current collector assembly 200.

In some other embodiments of the present disclosure, the connection plate 1011 and the protrusion 1012 may be separated from each other. The protrusion 1012 may be welded, bonded, inserted, or snapped to the connection plate 1011. In this way, the connection plate 1011 and the protrusion 1012 are two independent components. Such a manner can lower the production difficulty of the current collector assembly 200, and reduce the production costs of the current collector assembly 200. In addition, it is possible to improve a fault tolerance rate during welding the protrusion 1012 to the plurality of tabs 20211.

In some embodiments of the present disclosure, the protrusion 1012 is connected to the connection plate 1011 by welding. Such a connection manner is simple. Also, a connection between the protrusion 1012 and the connection plate 1011 is solid and less likely to be damaged.

In some embodiments of the present disclosure, the protrusion 1012 may be connected to the connection plate 1011 by electromagnetic pulse welding. A plurality of protrusions 1012 may also be connected to the connection plate 1011 by friction welding or by the ultrasonic welding.

In yet other embodiments of the present disclosure, the protrusion 1012 is arranged on the protection plate 201, and penetrates the plurality of tabs 20211 to be connected to the protection plate 201. The protrusion 1012 and the protection plate 201 may be integrally formed to reduce a number of parts of the current collector assembly 200, and reinforce a connection strength of the entire current collector assembly 200. In addition, it is possible to improve connection stability between the protrusion 1012 and the plurality of tabs 20211, lower a defective rate of the current collector assembly 200, and prolong the service life of the current collector assembly 200.

In still yet other embodiments of the present disclosure, the protection plate 201 and the protrusion 1012 may be separated from each other. The protrusion 1012 may be welded, bonded, inserted, or snapped to the protection plate 201. In this way, the protection plate 201 and the protrusion 1012 are two independent components. Such a manner can lower the production difficulty of the current collector assembly 200, and reduce the production costs of the current collector assembly 200. In addition, it is possible to improve a fault tolerance rate during welding the protrusion 1012 to the plurality of tabs 20211.

In some embodiments of the present disclosure, the protrusion 1012 is connected to the protection plate 201 by welding. Such a connection manner is simple. Also, a connection between the protrusion 1012 and the protection plate 201 is solid and less likely to be damaged.

In some embodiments of the present disclosure, the protrusion 1012 may be connected to the protection plate 201 by electromagnetic pulse welding. A plurality of protrusions 1012 may also be connected to the protection plate 201 by friction welding or by the ultrasonic welding.

In some embodiments of the present disclosure, a plurality of protrusions 1012 may be provided on the connection plate 1011 or the protection plate 201. The vibration direction of the high-frequency vibration is parallel to a direction in which the plurality of protrusions 1012 is arranged with a maximum density. That is, an arrangement density of the plurality of protrusions 1012 in the vibration direction of the high-frequency vibration is greater than an arrangement density of the plurality of protrusions 1012 in any direction other than the vibration direction of the high-frequency vibration. An arrangement density of the plurality of protrusions 1012 in an ultrasonic vibration direction is greater than an arrangement density of the plurality of protrusions 1012 in any direction other than the ultrasonic vibration direction. The plurality of protrusions 1012 protrudes in a direction facing away from the connection plate 1011. The plurality of protrusions 1012 is arranged in the ultrasonic vibration direction by a maximum arrangement density. The arrangement density of the plurality of protrusions 1012 in any direction other than the ultrasonic vibration direction is smaller than the arrangement density of the plurality of protrusions 1012 in the ultrasonic vibration direction.

In some embodiments of the present disclosure, the connection plate 1011 or the protection plate 201 having the protrusion 1012 provided thereon is abutted against the plurality of tabs 20211 with a pressure no less than 20N. An insufficient welding pressure, which may generate a small amount of a molten material on a welding part during the welding, makes it impossible to form an effective welding. An excessive welding pressure, which causes the molten material to flow too fast to flow out of the welding part, reduces the molten material required for solidification of a welding head, thereby weakening welding strength. Therefore, an appropriate welding pressure can improve welding performance for the current collector assembly 200.

In some embodiments of the present disclosure, the high-frequency vibration is a vibration generated by the ultrasonic welding. Due to a fast welding speed, high welding strength, and satisfying sealing performance of the ultrasonic welding, the ultrasonic welding has replaced conventional welding/bonding processes. The ultrasonic welding is inexpensive, clean, pollution-free, and brings no damage to a flexible connection sheet and the tabs 20211. Also, the ultrasonic welding features a stable welding process, good post-welding conductivity, an extremely low or near-zero resistance coefficient, and short welding time. Since the ultrasonic welding requires no flux, gas, or solder, no spark is generated during the welding. Hence, the ultrasonic welding is environmentally friendly and safe.

In some embodiments of the present disclosure, a welding time of the ultrasonic welding is no less than 30 ms. Since a too short welding time brings insufficient energy, a reliable weld joint cannot be formed. As the welding time increases, more energy will be absorbed by a member to be welded, a temperature of a welding surface can increase, and a welding area can be enlarged, and thus welding penetration deepens. In this manner, the welding strength is also enhanced. However, too long welding time can lead to excessive melting of the material at a welding position and cause a great material overflow, which may cause a decrease in strength. Therefore, an appropriate welding time can improve the welding performance for the current collector assembly 200.

In some embodiments of the present disclosure, the protection plate 201 is formed in a sheet-like shape, and the protrusion 1012 is formed on the connection plate 1011. The preparation method also includes, prior to abutting the connection plate 1011 having the protrusion 1012 provided thereon against the plurality of tabs 20211: covering the protection plate 201 on a surface at one side of the plurality of tabs 20211 in the thickness direction; and arranging a connector 101 at another side of the plurality of tabs 20211 in the thickness direction and positioning the protrusion 1012 opposite to the plurality of tabs 20211. By providing the protection plate 201 for covering the protrusion 1012, it is possible to prevent the top of the protrusion 1012 from protruding beyond the protection cover and avoid damages to the protrusion 1012.

Figure 2:
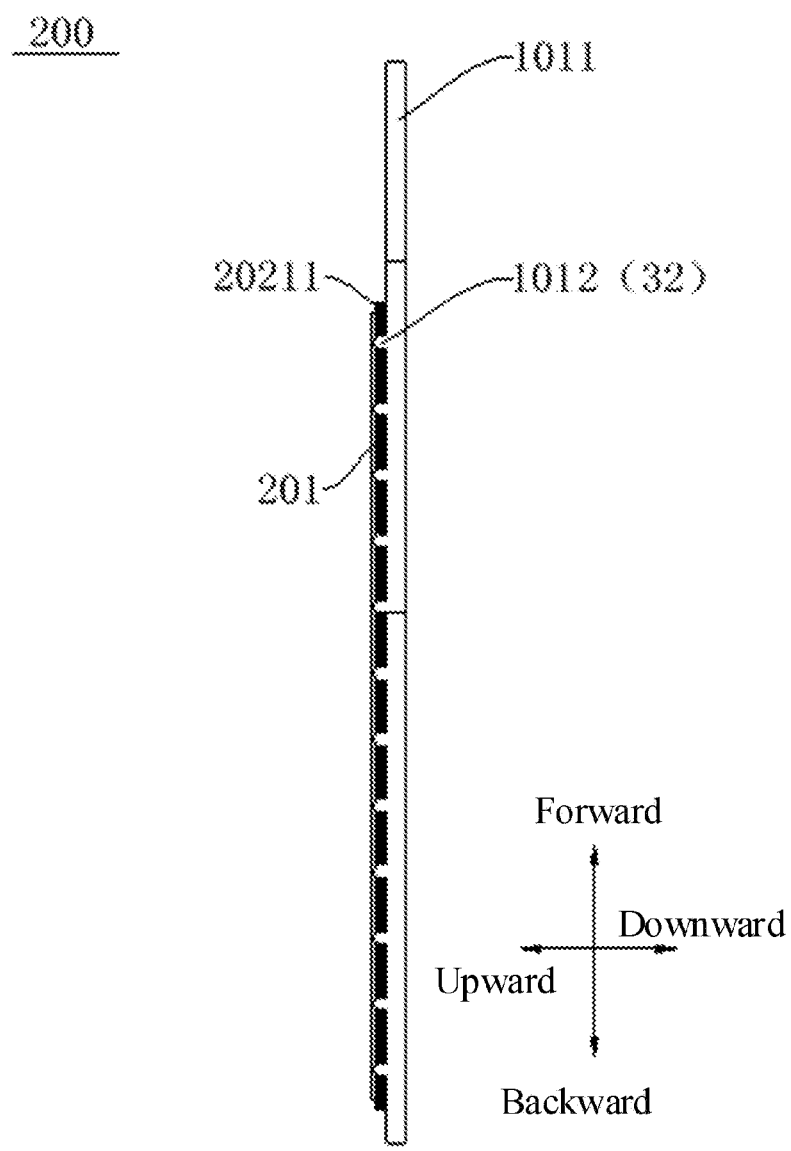
FIG. 2 is a schematic side view showing a current collector assembly illustrated in FIG. 1.
Figure 3:
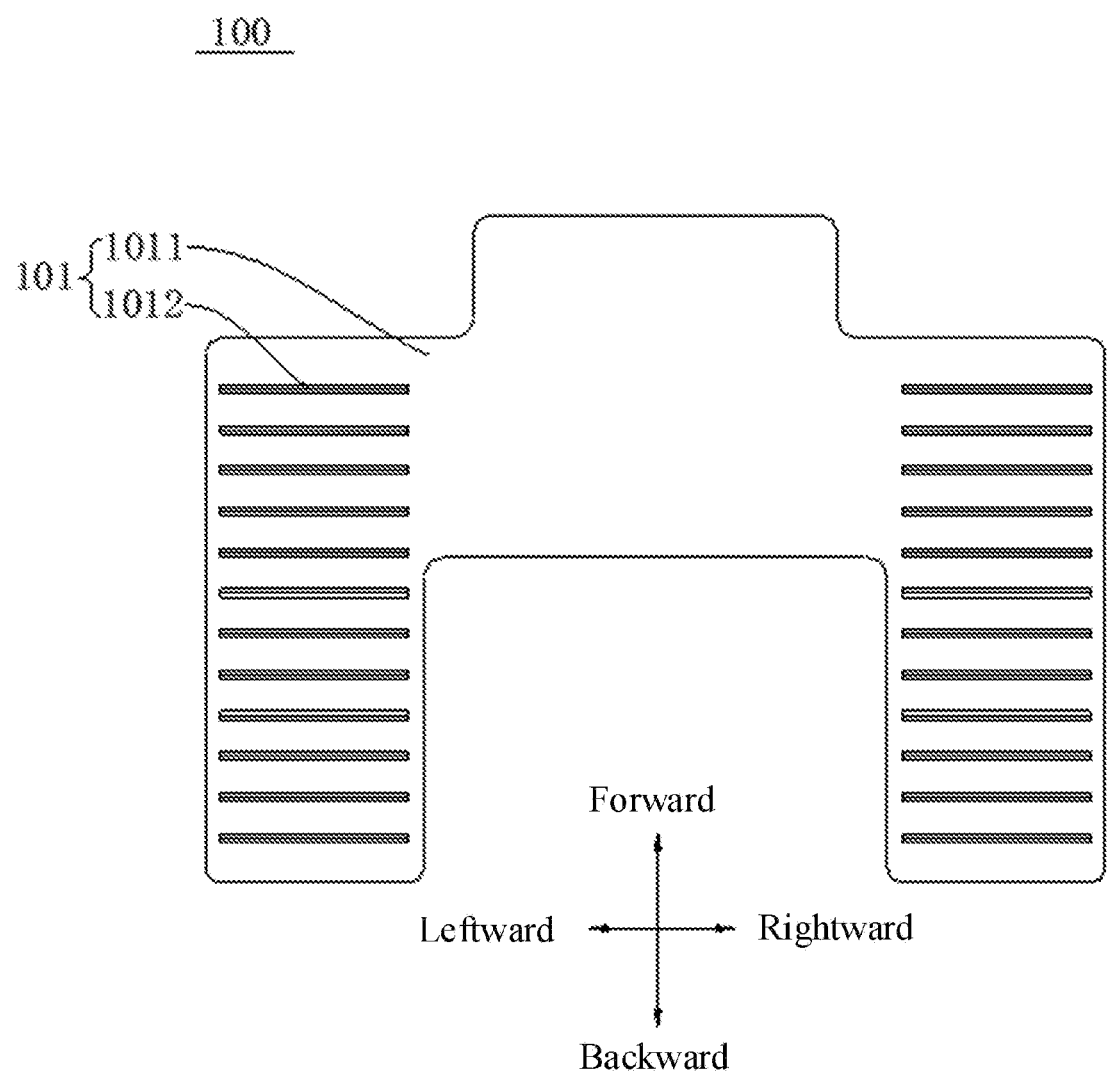
FIG. 3 is a schematic view showing a connector illustrated in FIG. 1.
Figure 4:
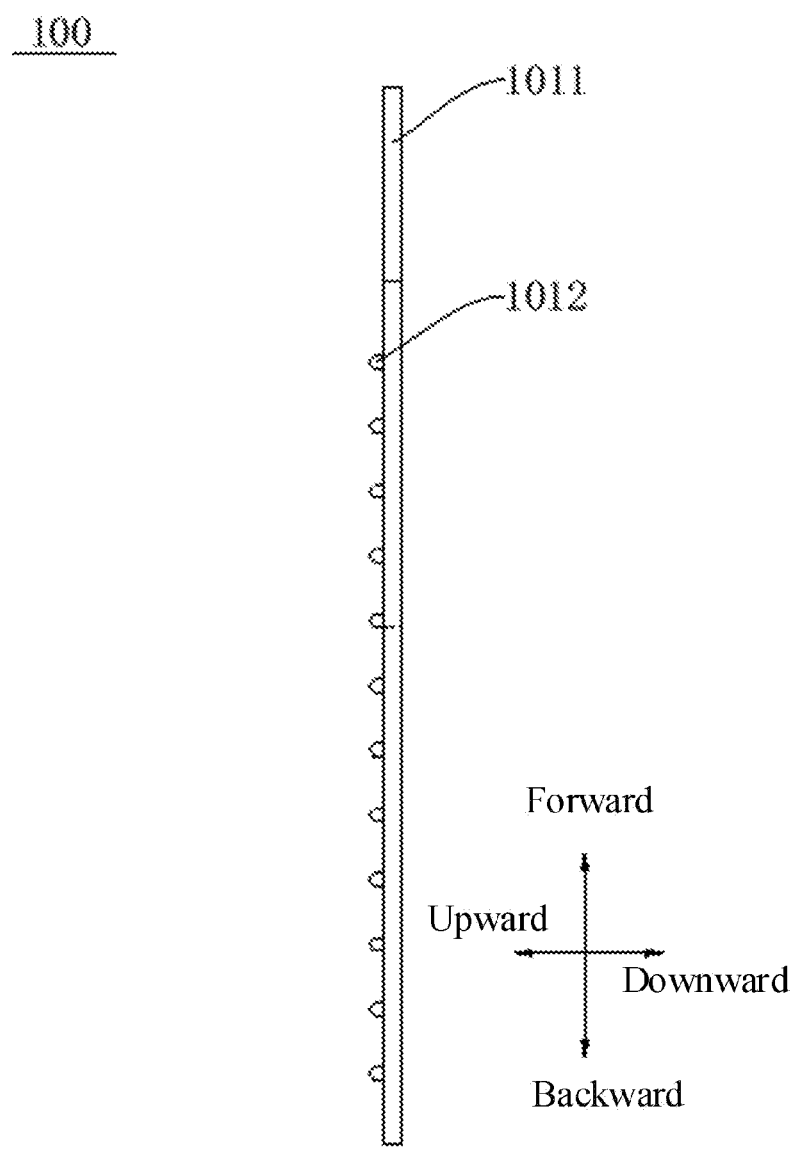
FIG. 4 is a schematic side view showing a connector illustrated in FIG. 3.

Further, the preparation method also includes, subsequent to piercing the plurality of tabs 20211 sequentially by the protrusion 1012 through the high-frequency vibration: connecting the protrusion 1012 to an inner surface of the protection plate 201 facing the plurality of tabs 20211 or embedding the protrusion 1012 within the protection plate 201 through the high-frequency vibration. For example, as illustrated in FIG. 2, the protrusion 1012 has an upper end fixedly connected to the protection plate 201 by the ultrasonic welding and connected to a lower side surface of the protection plate 201. Such a manner further reinforces the connection between the plurality of tabs 20211 and the protrusion 1012, and prevents the plurality of tabs 20211 from being separated from the protrusion 1012. In addition, the current collector assembly 200 has a more stable structure, which ensures a production yield of the current collector assembly 200, increases a yield of a battery cell 1000, and reduces dangers of a battery pack.

In some embodiments of the present disclosure, the upper end of the protrusion 1012 may also be embedded within the protection plate 201 to be connected to the protection plate 201.

Figure 31:
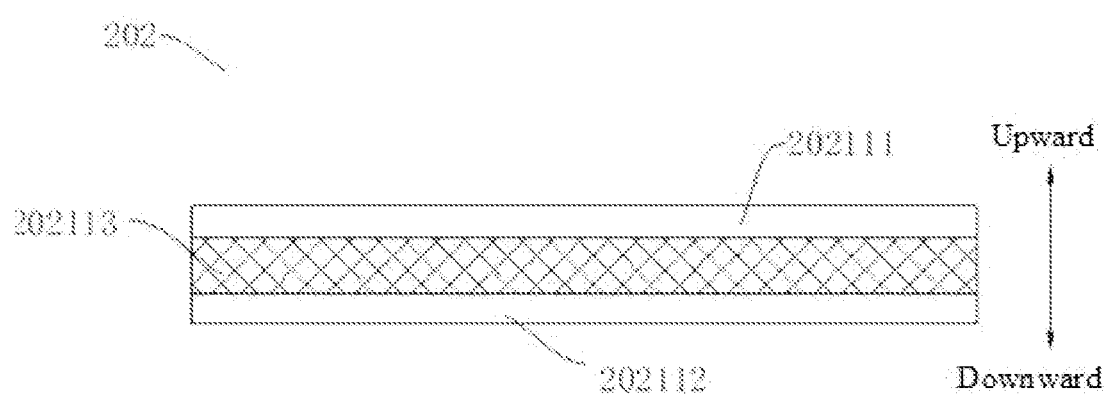
FIG. 31 is a schematic view showing a current collector.
Figure 32:
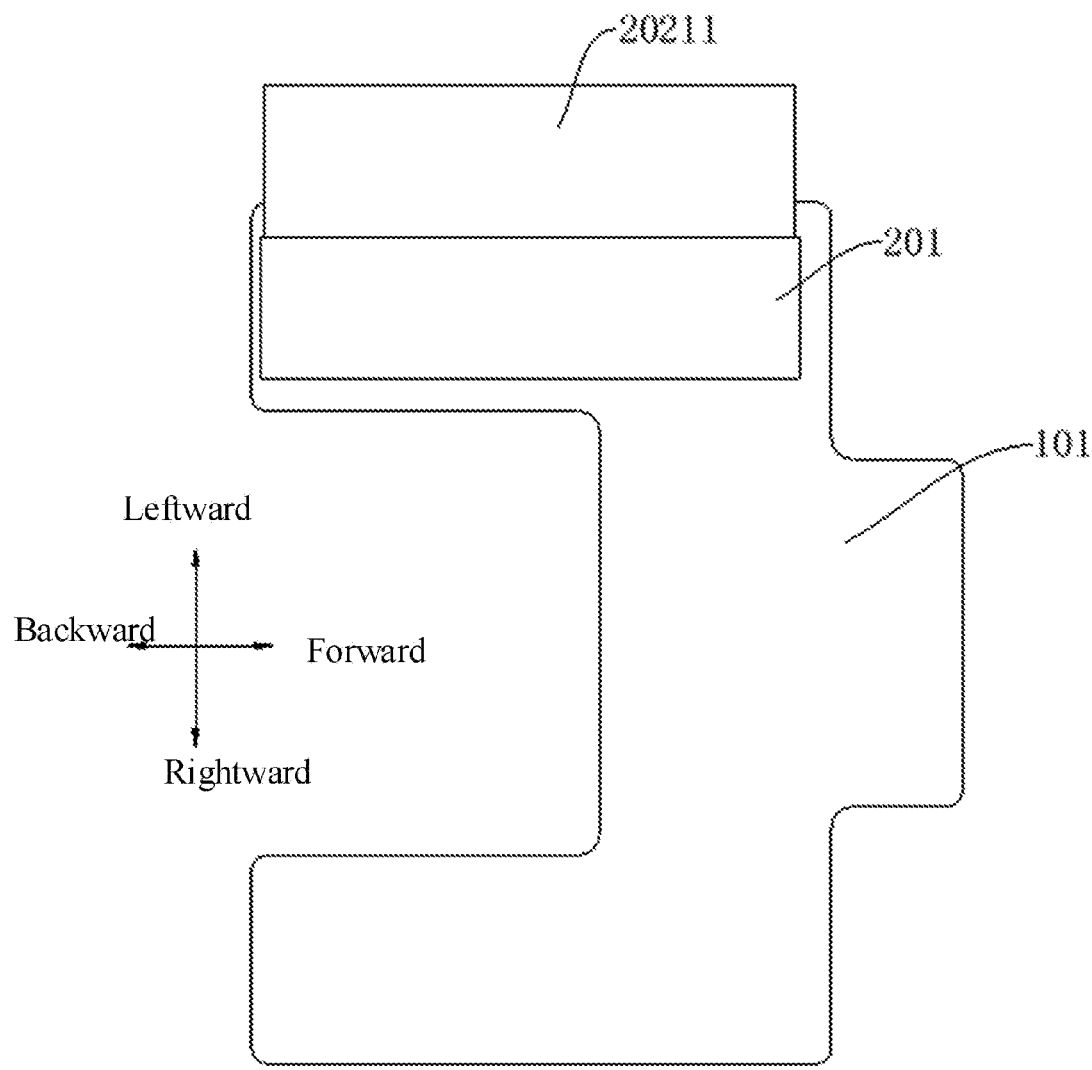
FIG. 32 is a schematic view showing a current collector assembly, in which a first protrusion is formed on a protection plate.
Figure 33:
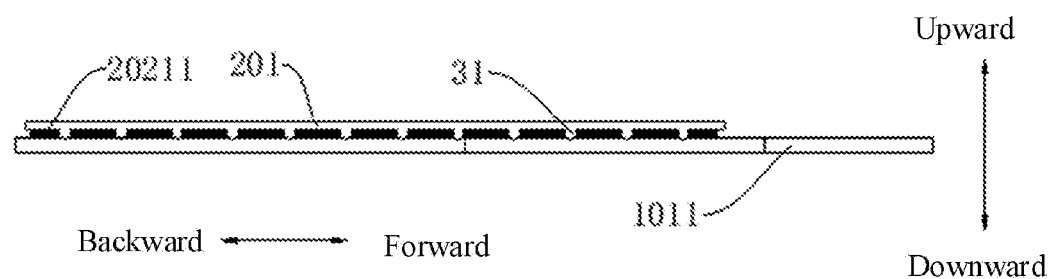
FIG. 33 is a schematic side view showing a current collector assembly illustrated in FIG. 32.
Figure 34:
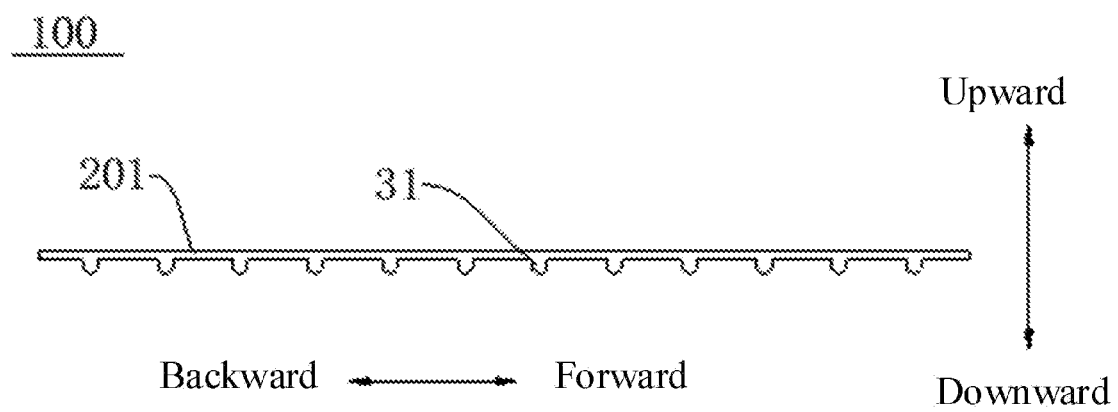
FIG. 34 is a schematic view showing a protection plate illustrated in FIG. 33.
Figure 35:
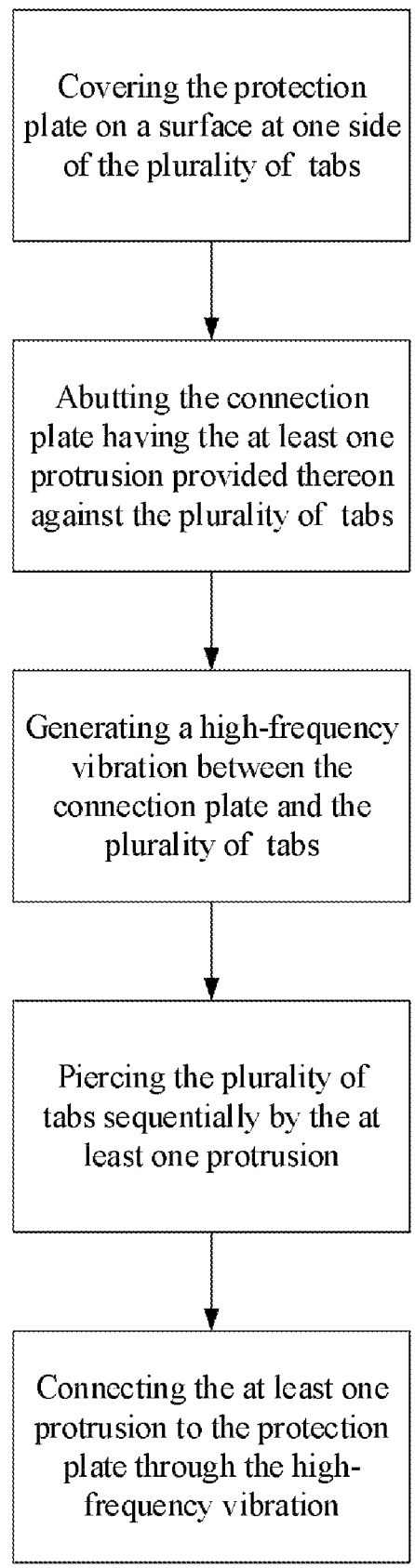
FIG. 35 is a flowchart illustrating a preparation method of a current collector assembly according to an embodiment in a first aspect of the present disclosure.

In some embodiments, the current collector 202 also includes a plurality of electrode sheets 2021 stacked with each other. Each of the plurality of electrode sheets 2021 includes a tab 20211. The tab 20211 includes a support insulation layer 202113, and a first conductive layer 202111 and a second conductive layer 202112 that covering surfaces on two sides of the support insulation layer 202113 in a thickness direction of the support insulation layer 202113, respectively. Referring to FIG. 31, the support insulation layer 202113 is located between the first conductive layer 202111 and the second conductive layer 202112. The first conductive layer 202111 and the second conductive layer 202112 cover an upper surface and a lower surface of the support insulation layer 202113, respectively.

In some embodiments of the present disclosure, the support insulation layer 202113 is a composite polymer insulation layer.

The preparation method of the current collector assembly 200 according to an embodiment of the present disclosure will be described below with reference to FIG. 1 to FIG. 35.

First, before the connection plate 1011 having the protrusion 1012 provided thereon is abutted against the plurality of tabs 20211, the protection plate 201 is covered on a surface at one side of the plurality of tabs 20211 in the thickness direction, and the connector 101 is arranged at another side of the plurality of tabs 20211 in the thickness direction, and the protrusion 1012 is positioned opposite to the plurality of tabs 20211. Then, the connection plate 1011 having the protrusion 1012 provided thereon is abutted against the plurality of tabs 20211. Thereafter, the high-frequency vibration is generated between the connection plate 1011 having the protrusion 1012 provided thereon and the plurality of tabs 20211. The plurality of tabs 20211 is then pierced sequentially by the protrusion 1012 through the high-frequency vibration. Finally, the protrusion 1012 is connected to the inner surface of the protection plate 201 through the high-frequency vibration.

According to an embodiment in the second aspect of the present disclosure, a current collector assembly 200 is prepared by the preparation method of the current collector assembly 200 according to any embodiment in the above-mentioned first aspect of the present disclosure.

The current collector assembly 200 according to embodiments of the present disclosure is formed by the preparation method of the current collector assembly 200 according to any embodiment in the above-mentioned first aspect. Therefore, it is possible to lower the difficulty of preparing the current collector assembly 200, shortens time for fabricating the current collector assembly 200, reduces the labor costs, and ensures reliability of the current collector assembly 200.

In some embodiments, a plurality of first layers of tabs 20211 is stacked in the thickness direction of the first plurality of tabs 20211. A protection member includes the protection plate 201 and a first protrusion 31 arranged on the protection plate 201. The protection plate 201 is arranged at one side of the plurality of tabs 20211 in the thickness direction. The first protrusion 31 penetrates the plurality of tabs 20211 to be electrically connected to the plurality of tabs 20211. The connector 101 includes the connection plate 1011 and a second protrusion 32 arranged on the connection plate 1011. The connection plate 1011 is arranged at another side of the plurality of tabs 20211 in the thickness direction. The second protrusion 32 penetrates the plurality of tabs 20211 to be electrically connected to the plurality of tabs 20211.

That is, the protrusion 1012 is located on the protection plate 201. The second protrusion 32 is located on the connection plate 1011. Both the first protrusion 31 and the second protrusion 32 pierce the plurality of tabs 20211 to be electrically connected to the plurality of tabs 20211. The first protrusion 31 pierces the plurality of tabs 20211 to be connected to the connection plate 1011. The second protrusion 32 pierces the plurality of tabs 20211 to be connected to the protection plate 201. The protection plate 201 and the connection plate 1011 are arranged on two sides of the plurality of tabs 20211 in the thickness direction.

In some embodiments, the plurality of protrusions 1012 is provided and arranged in a matrix. The plurality of protrusions 1012 arranged in the matrix reinforce the connection between the plurality of tabs 20211 and the protrusion 1012, and prevents the plurality of tabs 20211 and the protrusions 1012 from being separated from each other during transportation or use. In addition, it is possible to increases the yield of the battery cell 1000, and enlarges a contact area between the protrusions 1012 and each of the plurality of tabs 20211, thereby enlarging an overcurrent area. Therefore, heat can be dissipated uniformity, and the battery pack is less prone to failures. In this manner, a hazard to a user can be lowered and use experience of the user can be improved.

In some embodiments of the present disclosure, the connection plate 1011 and the protrusion 1012 are made of a same material. When different materials are used, parameters such as temperature resistance and electric resistance of a conductor are also different. Therefore, great safety hazards exist. However, using the same material can ensure the reliability of the battery cell 1000, and reduces a failure rate. In addition, it is possible to ensure use safety of the battery pack, thereby avoiding accidents.

In some embodiments of the present disclosure, the connection plate 1011 is made of a T2 pure copper, a copper alloy, or the like.

Figure 5:
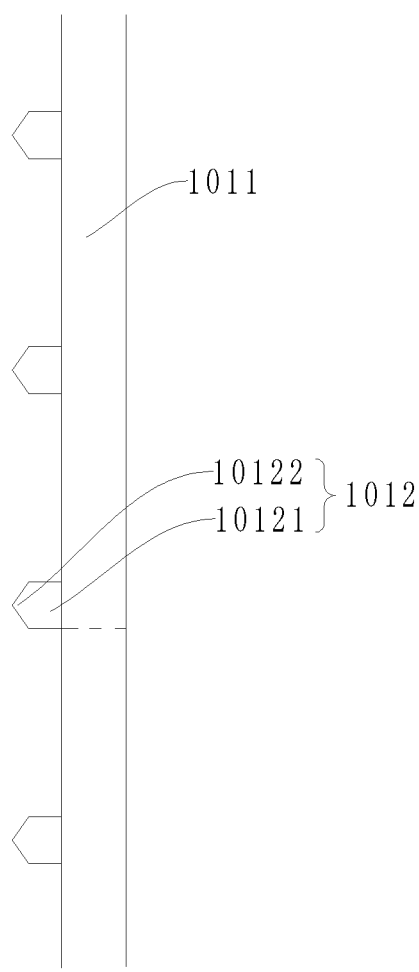
FIG. 5 is a partially enlarged view showing a protrusion illustrated in FIG. 4.
Figure 6:
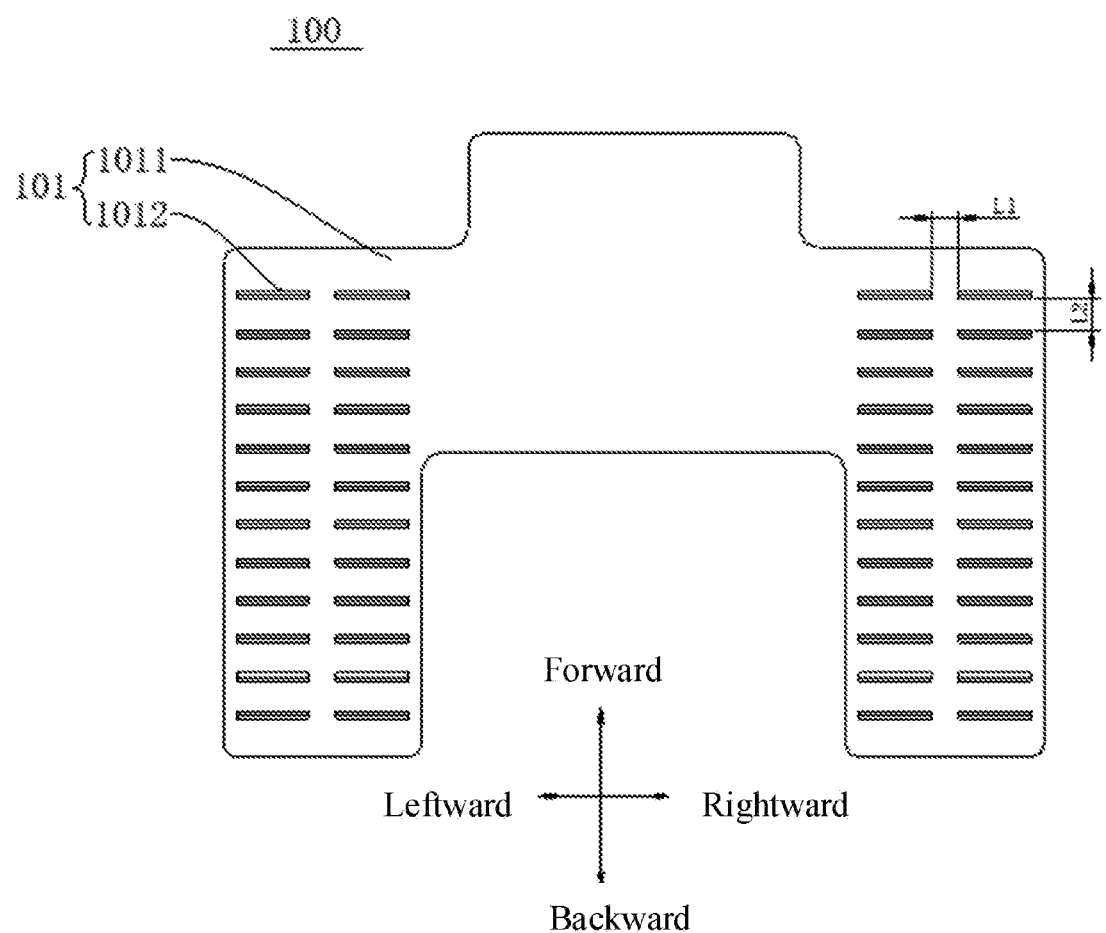
FIG. 6 is a schematic view showing a connector illustrated in FIG. 1 according to another embodiment.
Figure 7:
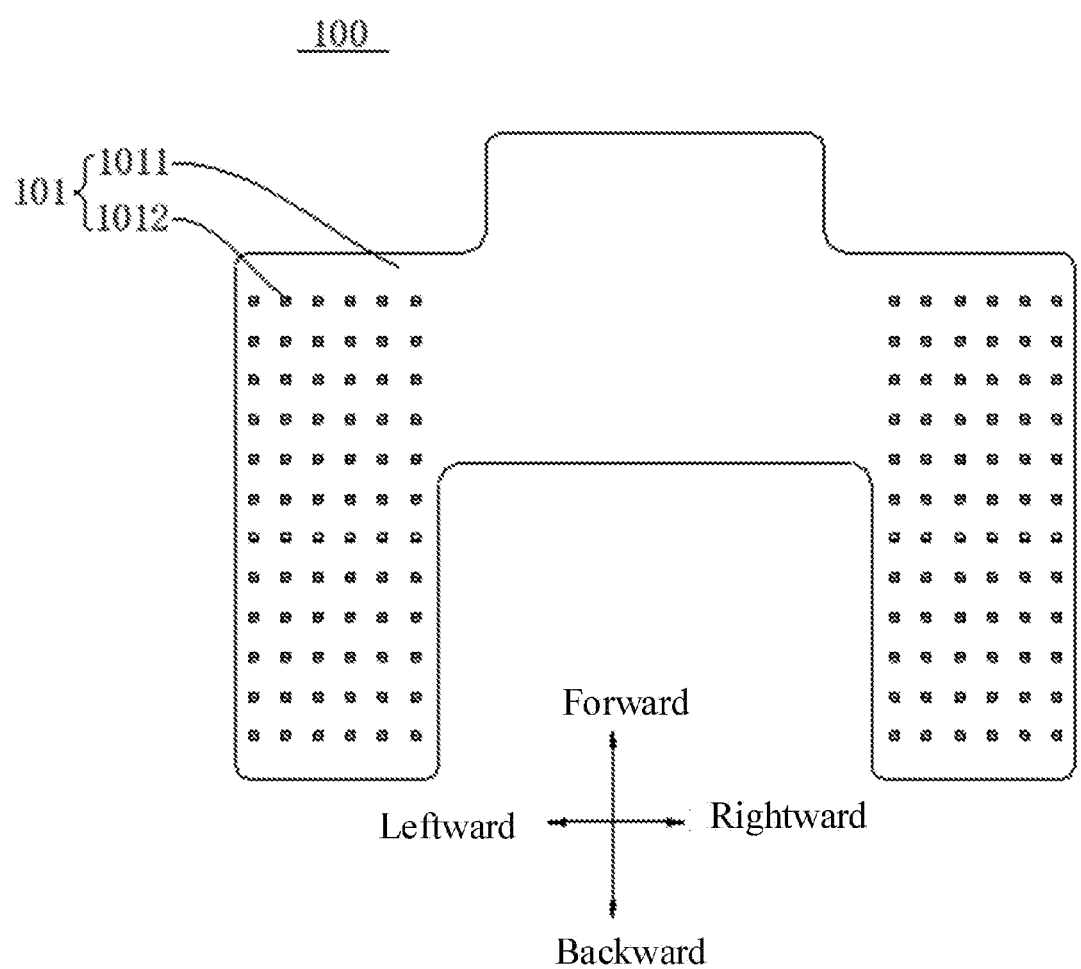
FIG. 7 is a schematic view showing a connector illustrated in FIG. 1 according to yet another embodiment.
Figure 8:
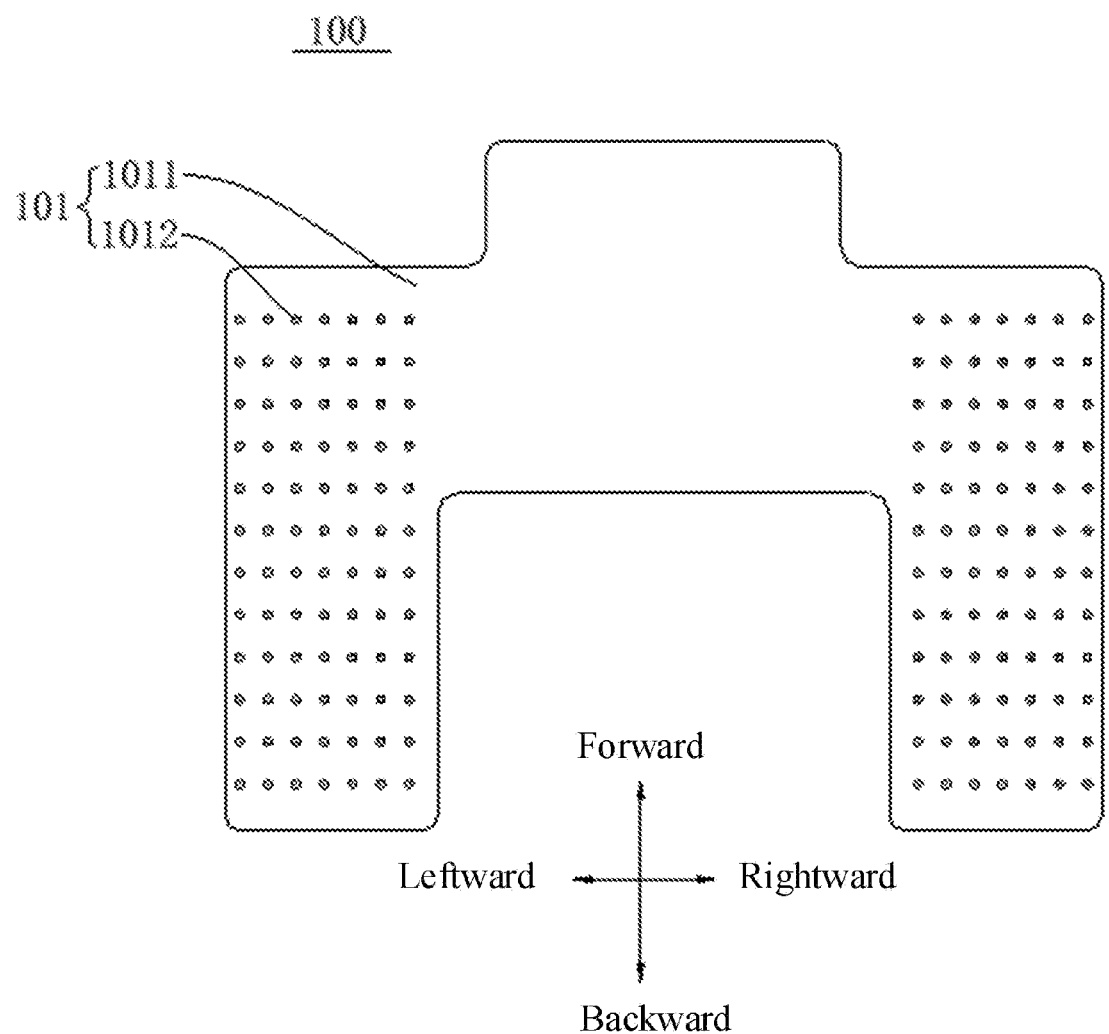
FIG. 8 is a schematic view showing a connector illustrated in FIG. 1, in which a protrusion is formed as a cone.
Figure 9:
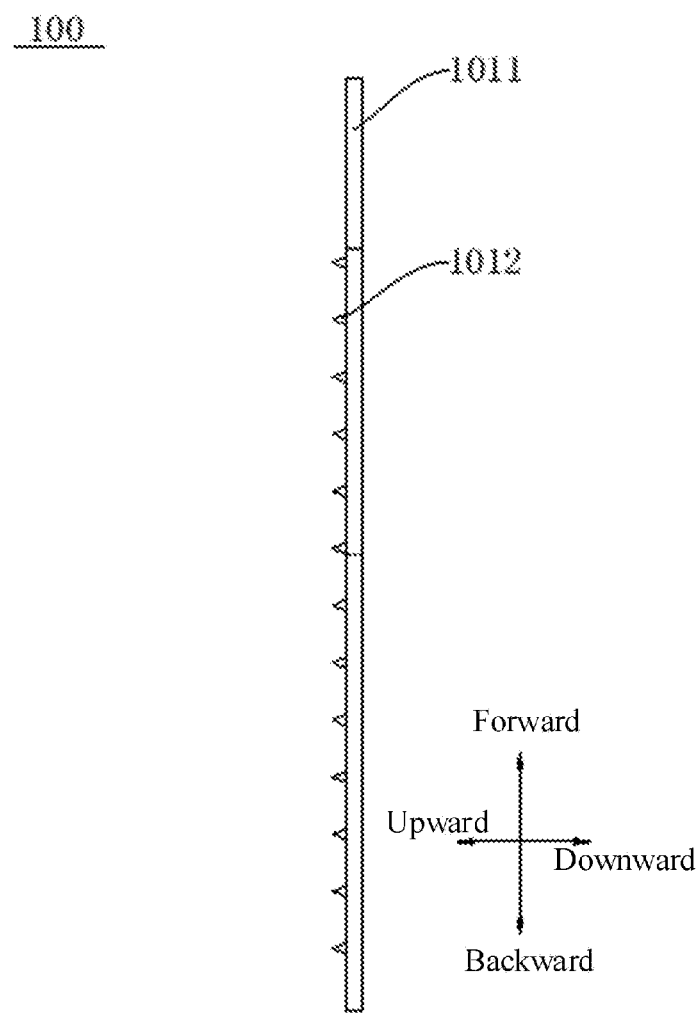
FIG. 9 is a schematic side view showing a connector illustrated in FIG. 8.
Figure 10:
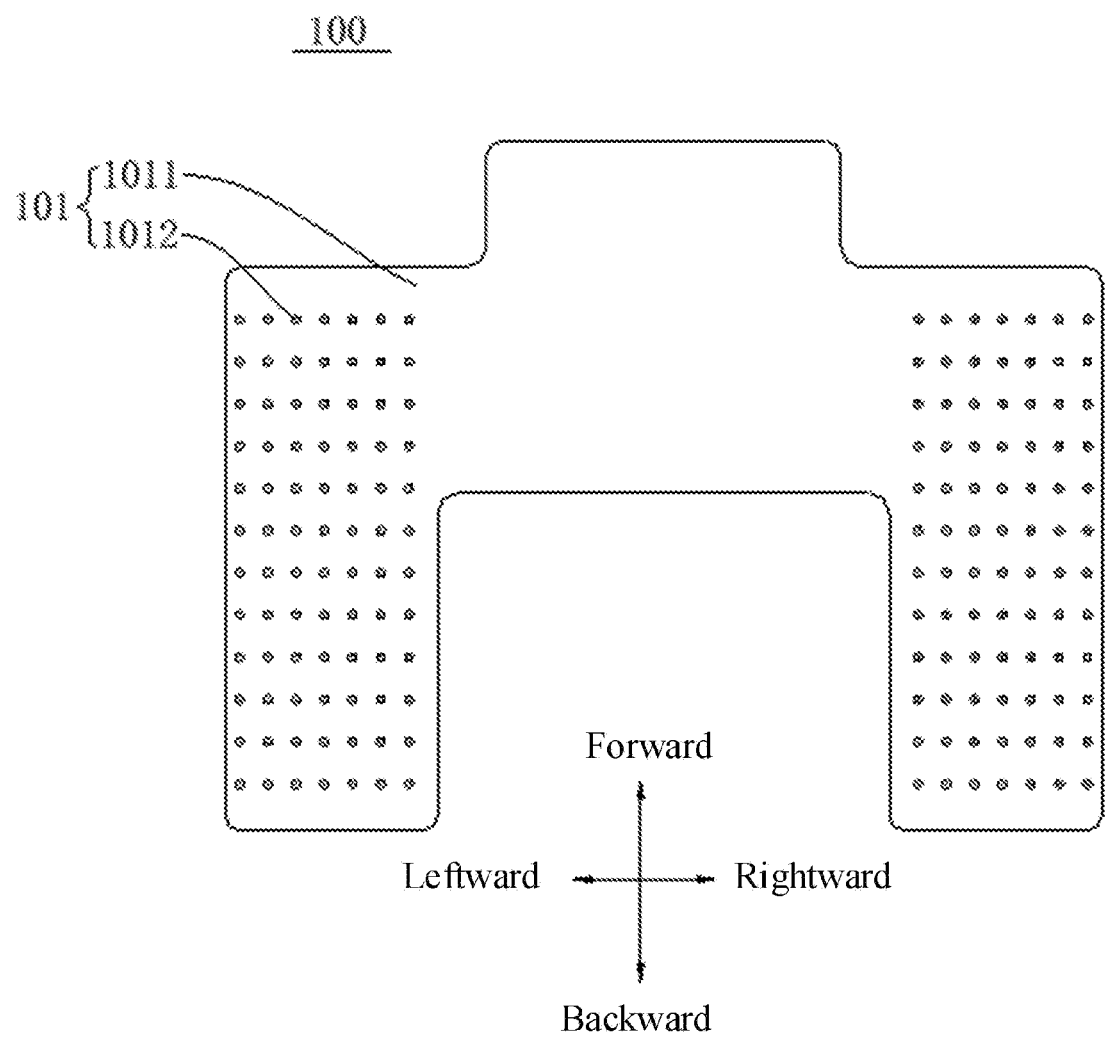
FIG. 10 is a schematic view showing a connector illustrated in FIG. 1 according to still yet another embodiment.
Figure 11:
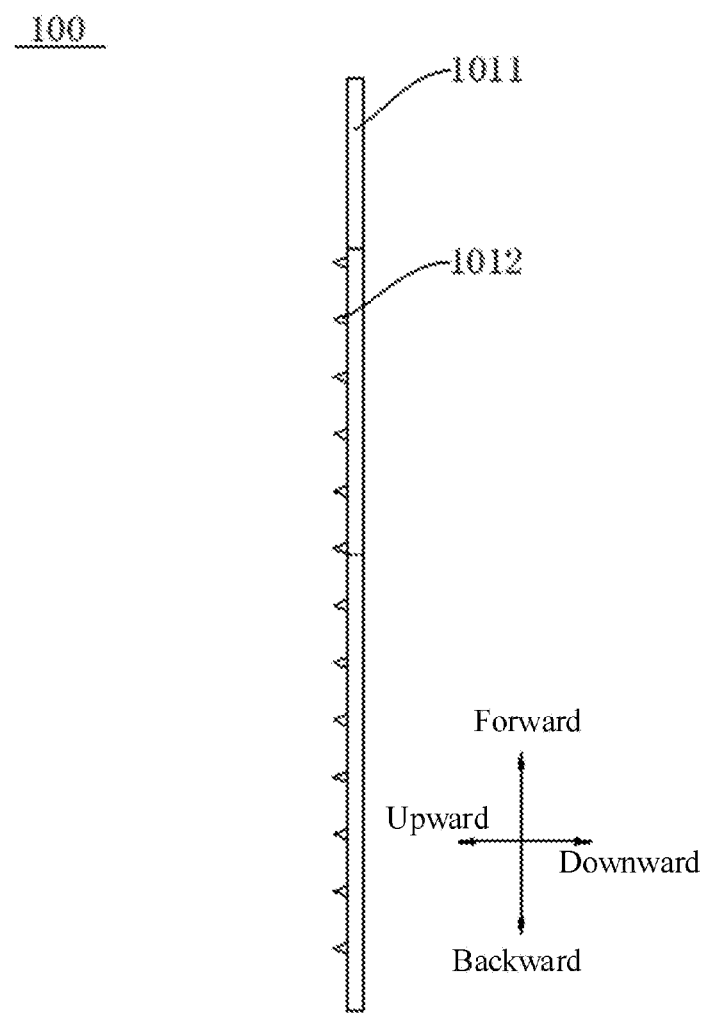
FIG. 11 is a schematic side view showing a connector illustrated in FIG. 10.
Figure 12:
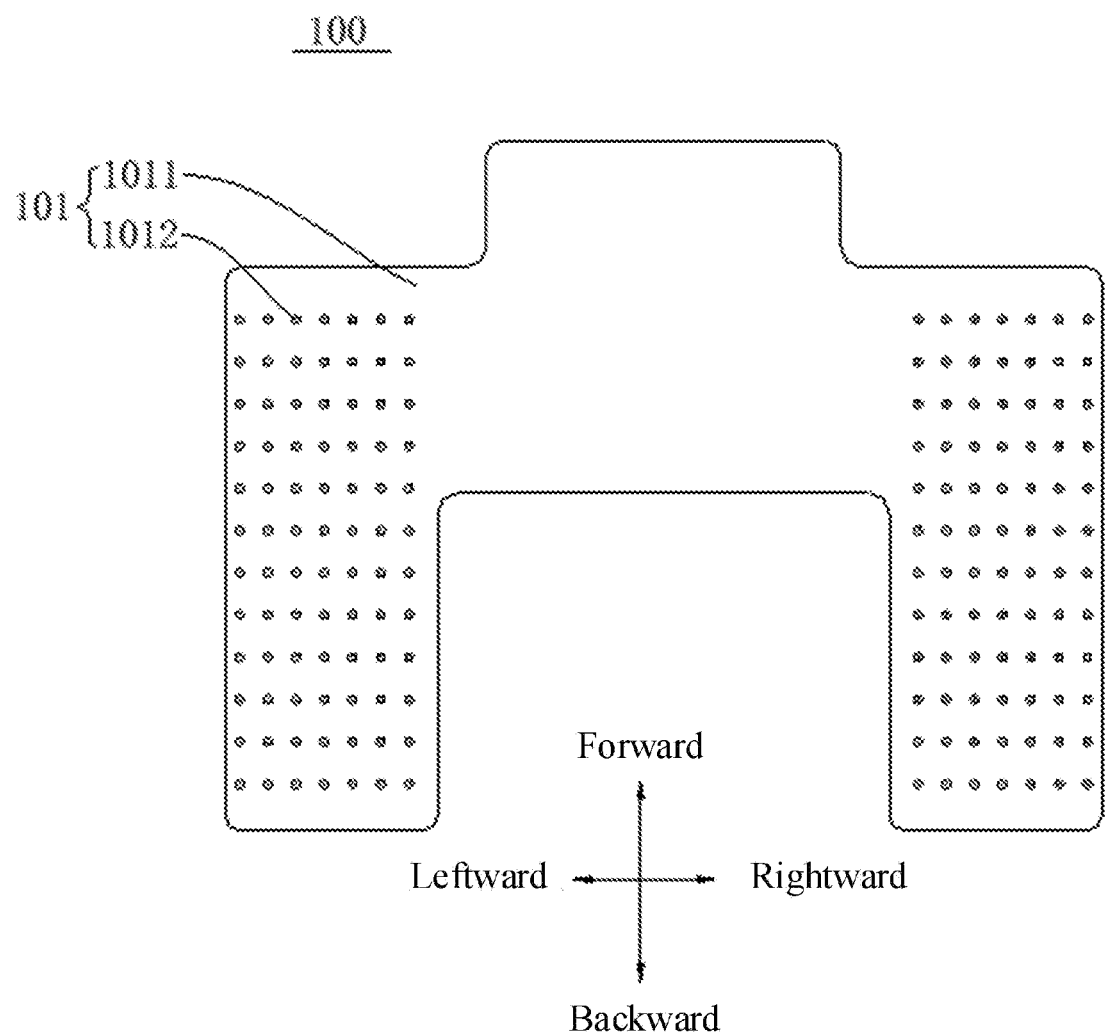
FIG. 12 is a schematic view showing a connector illustrated in FIG. 1, in which a protrusion includes a connection segment and a piercing segment.
Figure 13:
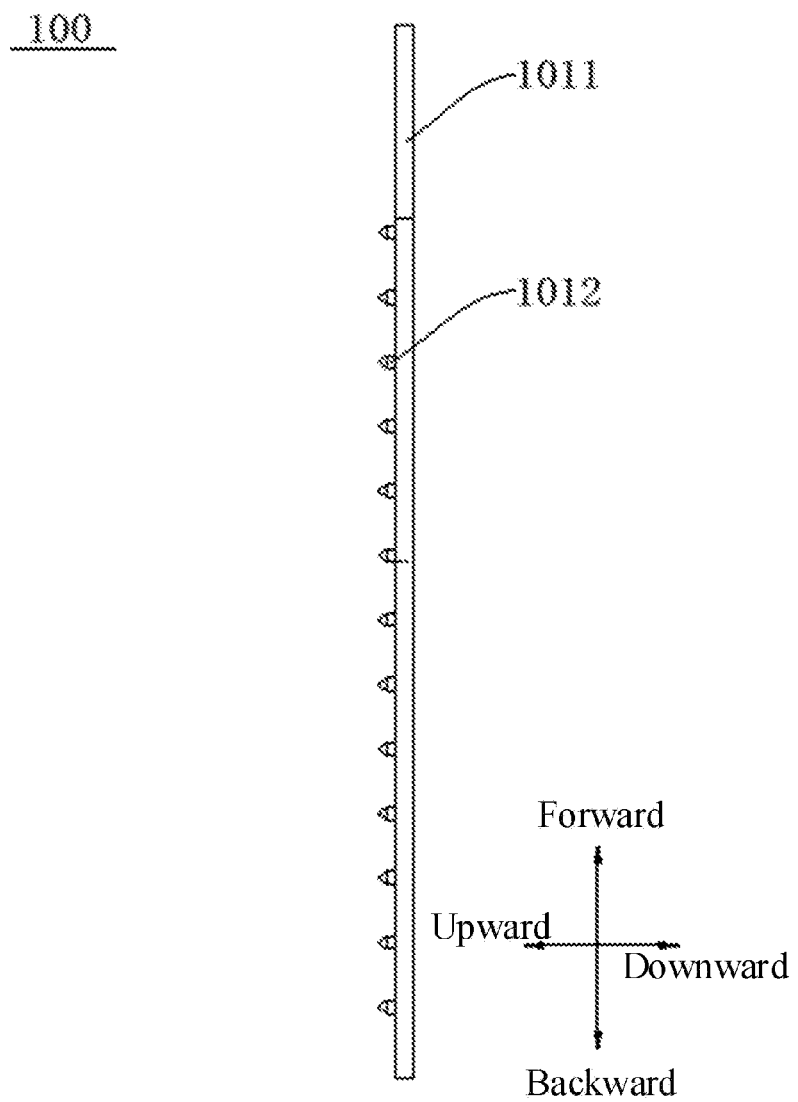
FIG. 13 is a schematic side view showing a connector illustrated in FIG. 12.
Figure 14:
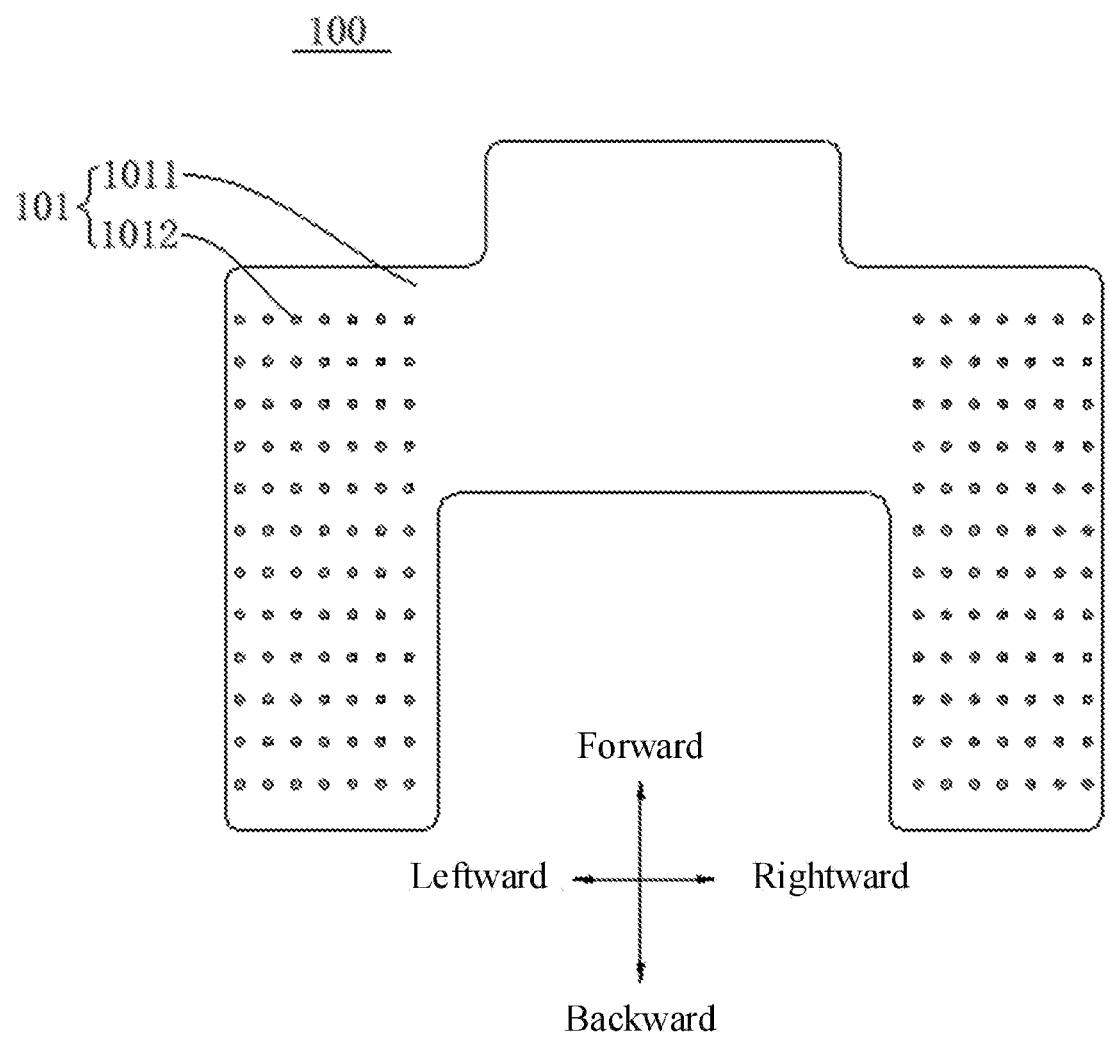
FIG. 14 is a schematic view showing a connector illustrated in FIG. 1, in which a protrusion is formed into a pyramid.
Figure 15:
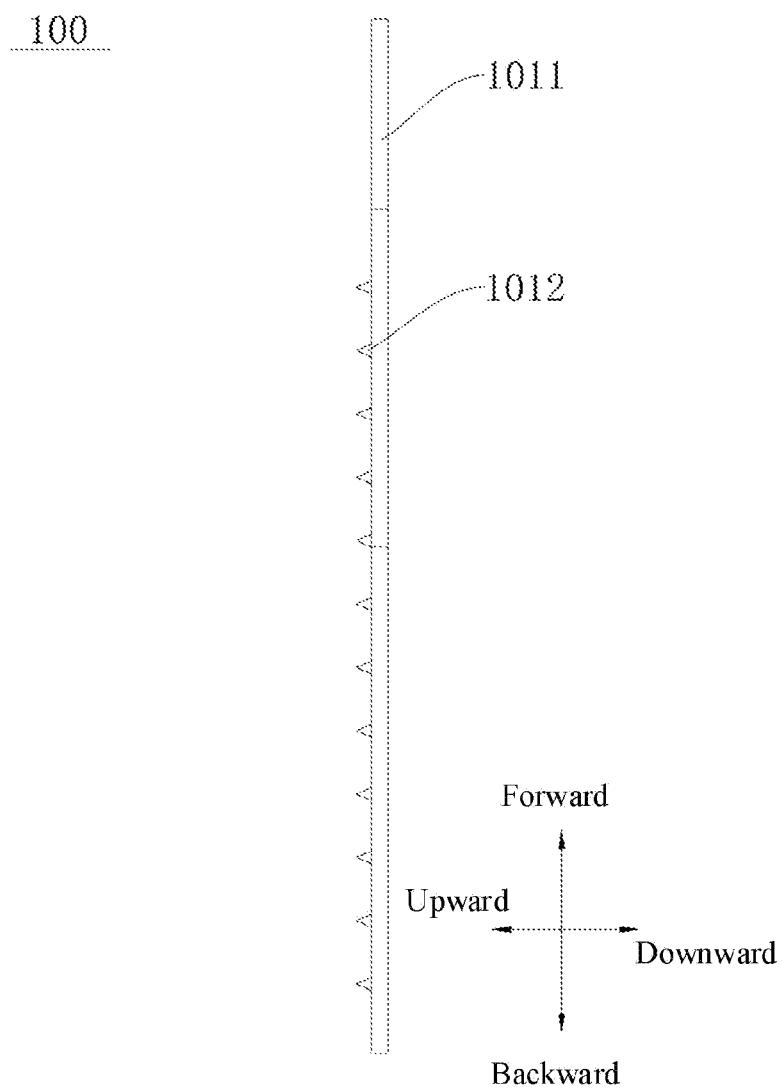
FIG. 15 is a schematic side view showing a connector illustrated in FIG. 14.
Figure 16:
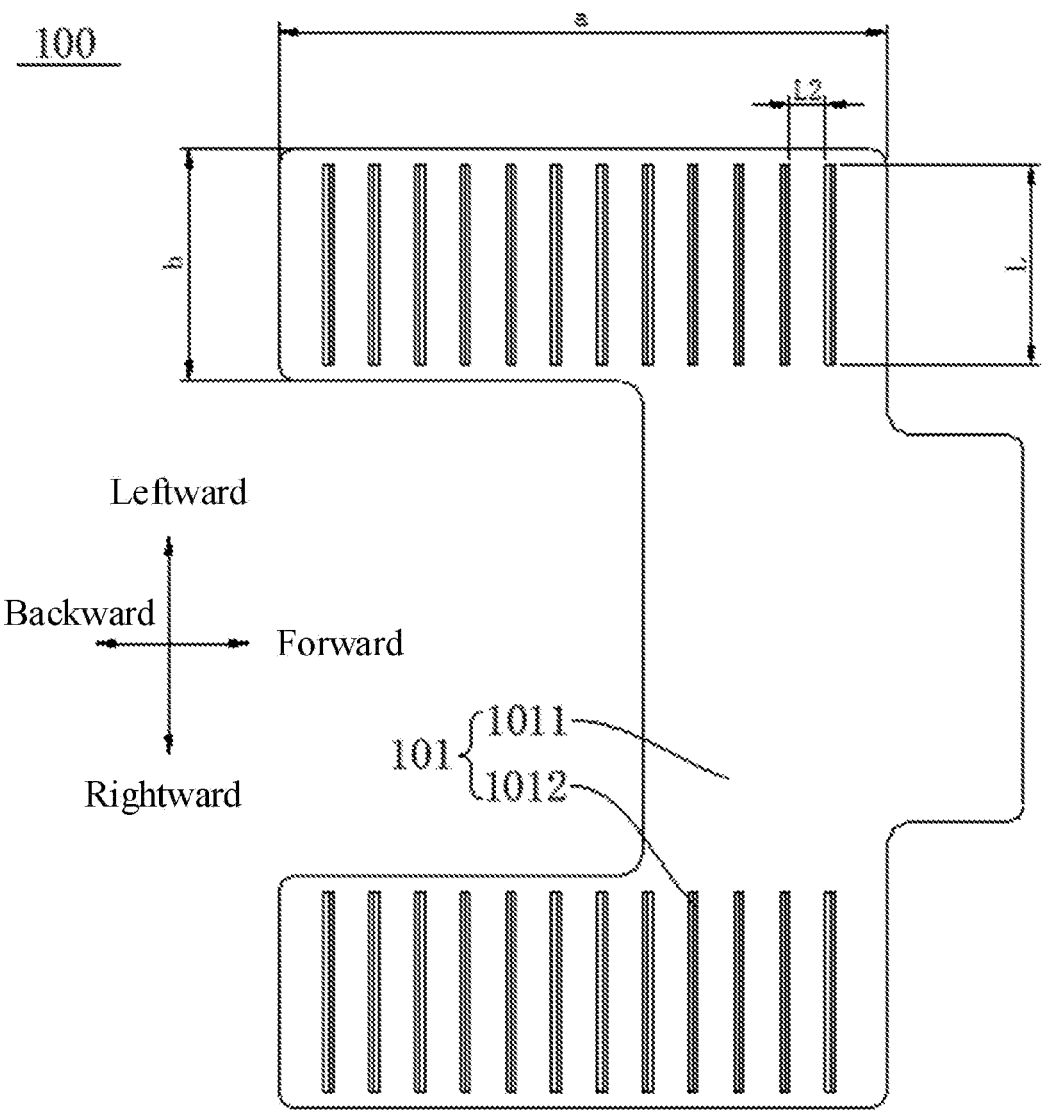
FIG. 16 is a schematic view showing a connector illustrated in FIG. 1 according to a specific embodiment.
Figure 17:
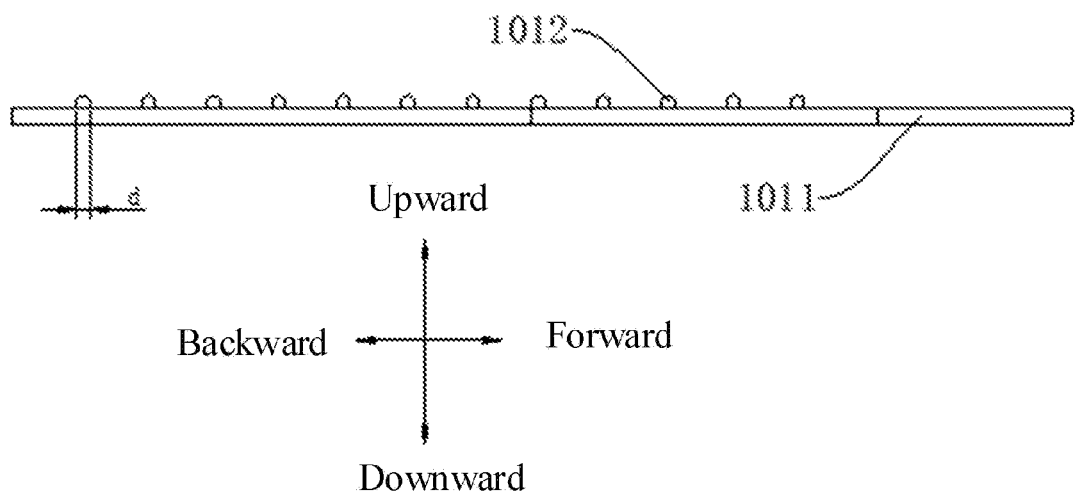
FIG. 17 is a schematic side view showing a connector illustrated in FIG. 16.
Figure 18:
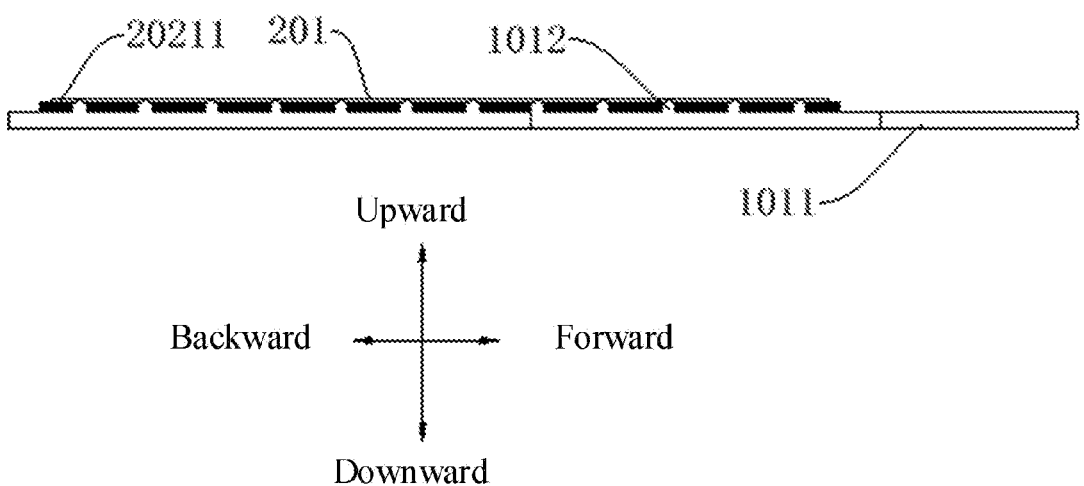
FIG. 18 is a schematic side view showing a current collector assembly illustrated in FIG. 16.
Figure 19:
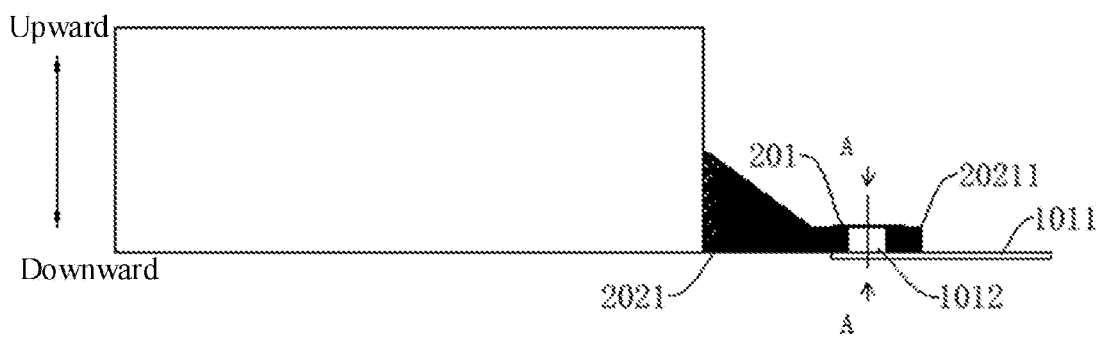
FIG. 19 is a schematic view showing a battery cell according to an embodiment in a third aspect of the present disclosure.
Figure 20:
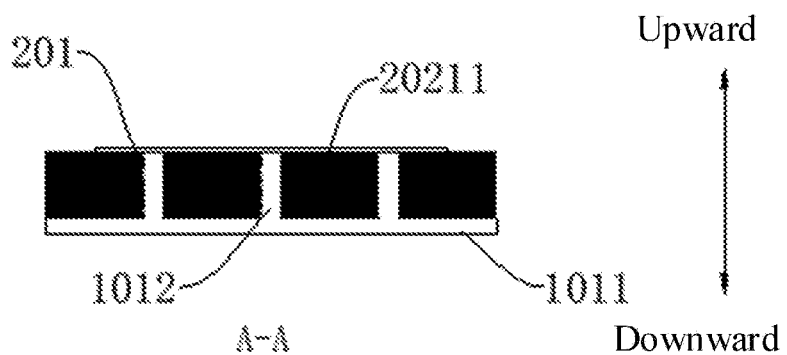
FIG. 20 is a schematic view showing a current collector assembly illustrated in FIG. 19.
Figure 21:
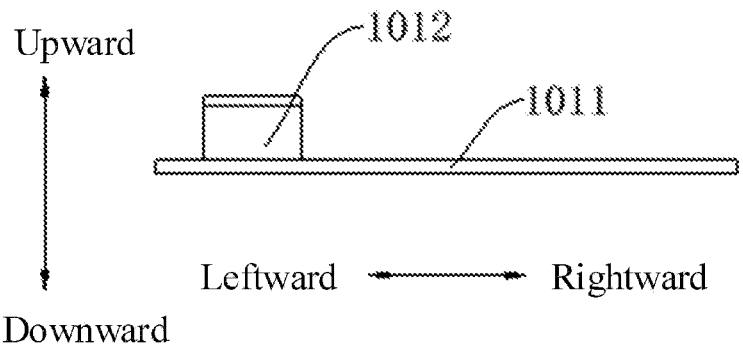
FIG. 21 is a schematic view showing a connector illustrated in FIG. 19.
Figure 22:
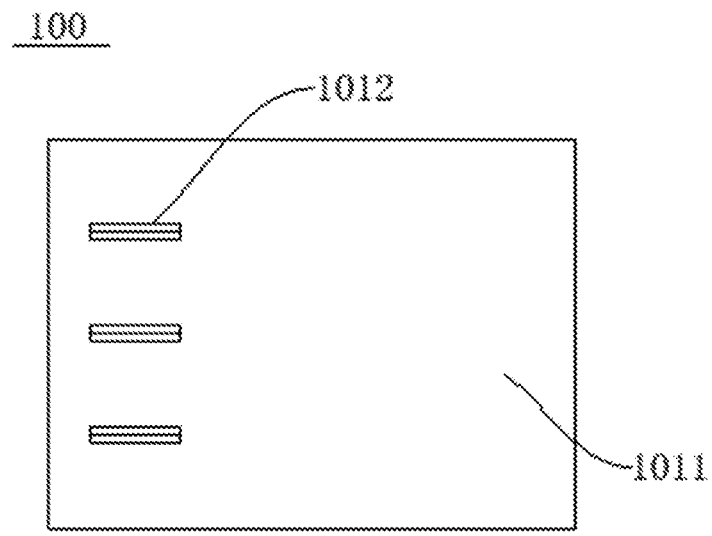
FIG. 22 is a schematic top view showing a connector illustrated in FIG. 20.
Figure 23:
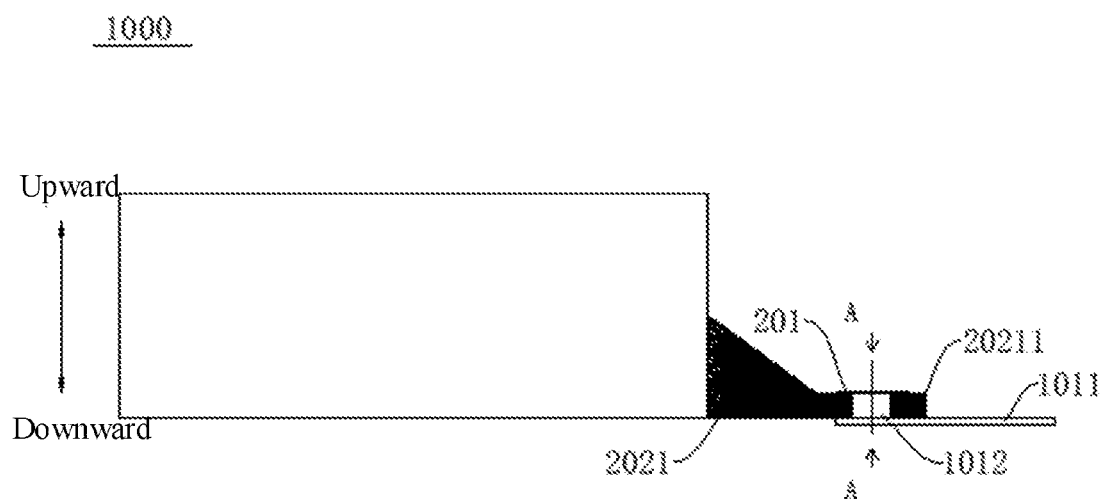
FIG. 23 is a schematic view showing a battery cell according to another embodiment.
Figure 24:
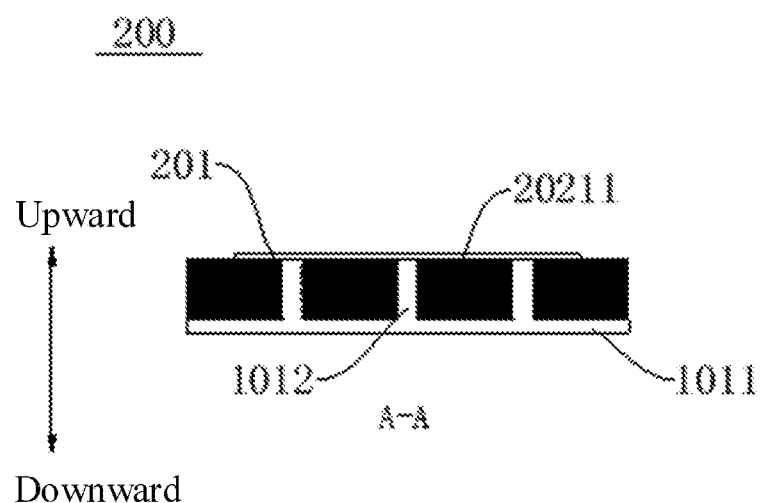
FIG. 24 is a schematic view showing a current collector assembly illustrated in FIG. 23.
Figure 25:
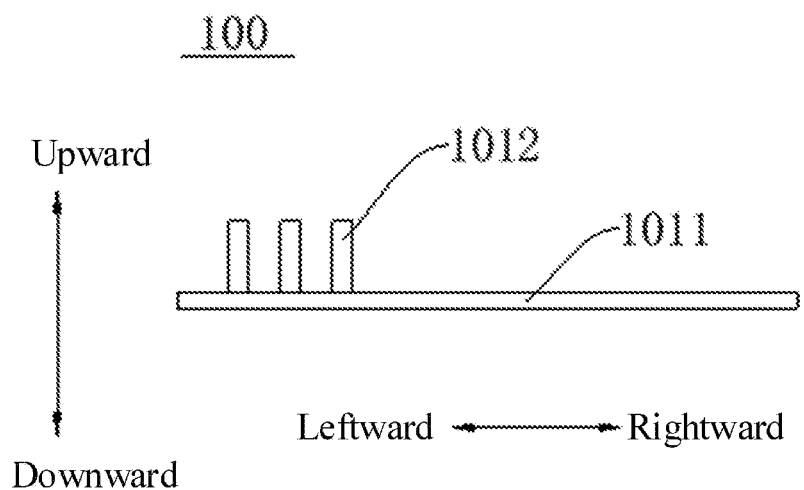
FIG. 25 is a schematic view showing a connector illustrated in FIG. 23.
Figure 26:
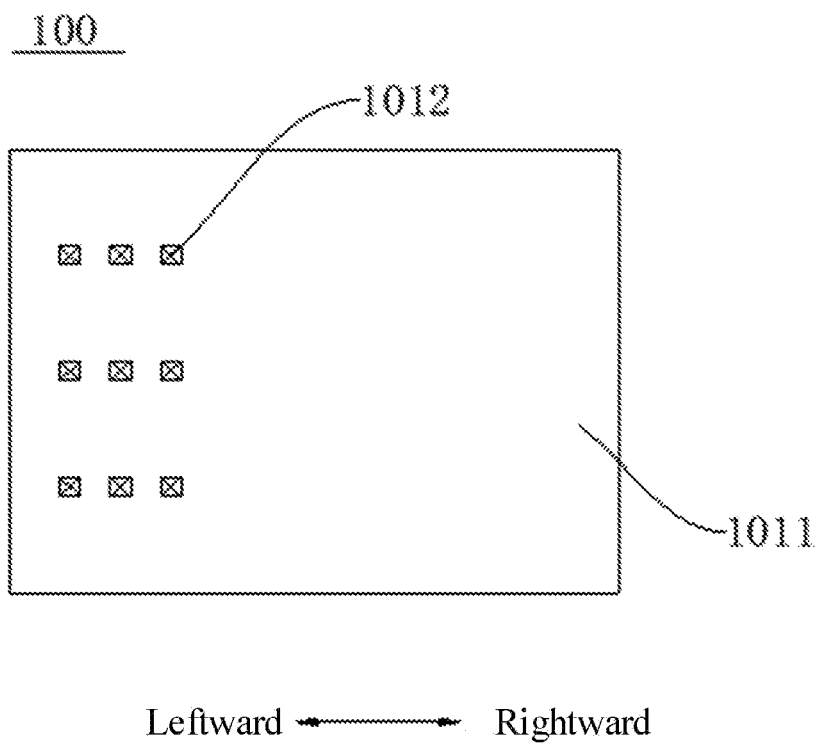
FIG. 26 is a schematic top view showing a connector illustrated in FIG. 25.
Figure 27:
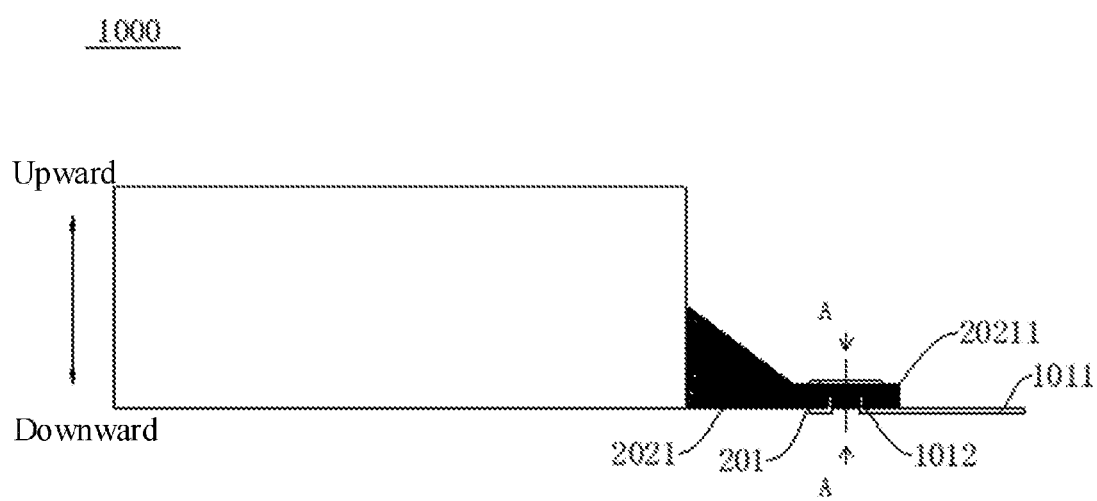
FIG. 27 is a schematic view showing a battery cell according to yet another embodiment.
Figure 28:
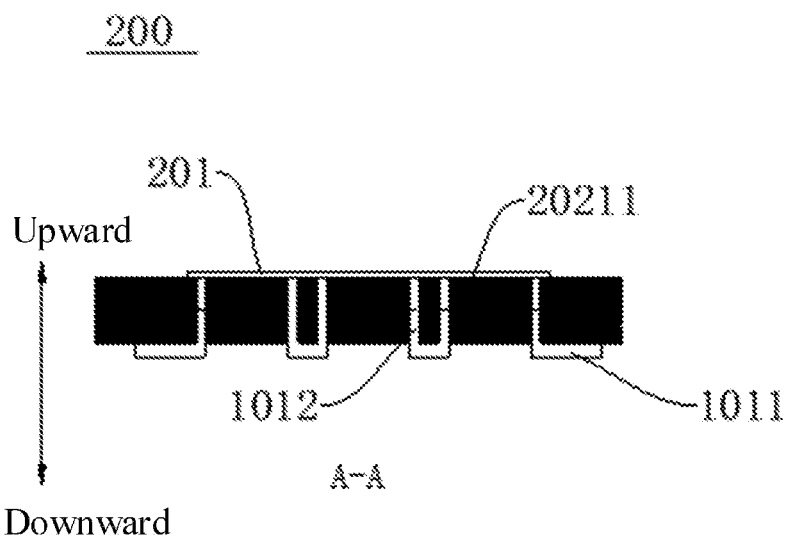
FIG. 28 is a schematic view showing a current collector assembly illustrated in FIG. 27.
Figure 29:
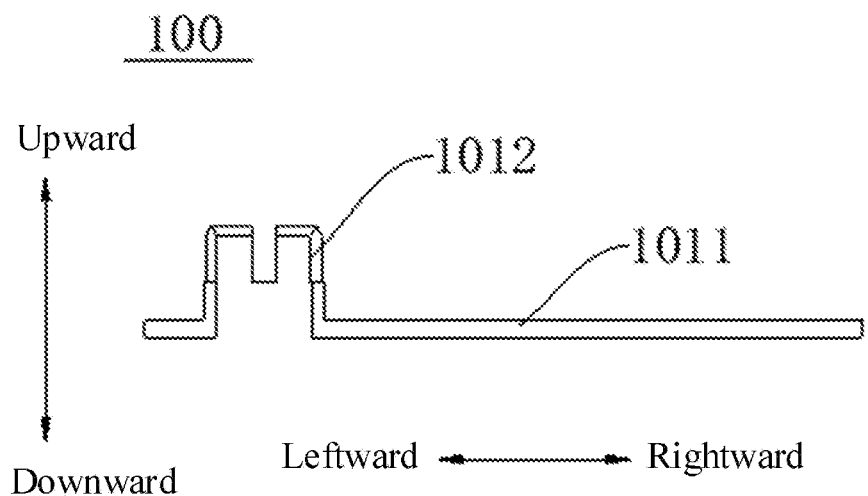
FIG. 29 is a schematic view showing a connector illustrated in FIG. 27.
Figure 30:
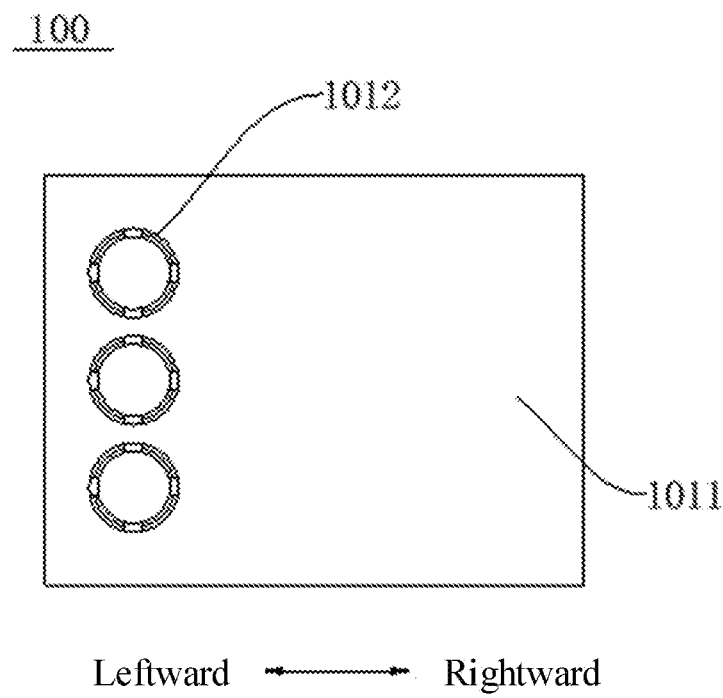
FIG. 30 is a schematic top view showing a connector illustrated in FIG. 29.

In some other embodiments, referring to FIG. 5, the protrusion 1012 includes two segments, i.e., a connection segment 10121 and a piercing segment 10122. The connection segment 10121 is formed at a lower part of the protrusion 1012, and the piercing segment 10122 is formed at an upper part of the protrusion 1012. The connection segment 10121 is connected to the connection plate 1011, and the piercing segment 10122 is connected to an upper end of the connection segment 10121.

In a further embodiment, the piercing segment 10122 of the protrusion 1012 is configured to pierce the plurality of tabs 20211. The connection segment 10121 of the protrusion 1012 is configured to be connected to the plurality of tabs 20211. In this manner, it is easy for welding energy to penetrate the connector 101 and the plurality of tabs 20211, which reduces a difficulty of welding the plurality of tabs 20211 to the connector 101, and shortens fabrication time. Also, the connection between the plurality of tabs 20211 and the connector 101 can be reinforced to implement a solid connection. Therefore, the connection is reinforced while ensuring a piercing effect of the protrusion 1012.

According to an embodiment in a third aspect of the present disclosure, a battery cell 1000 includes the current collector assembly 200 according to any embodiment in the above-mentioned second aspect of the present disclosure.

With the battery cell 1000 according to the embodiments of the present disclosure, by applying the current collector assembly 200 according to any embodiment in the above-mentioned second aspect to the battery cell 1000, it is possible to lower the difficulty of assembling the battery cell 1000, and shortens time for fabricating the battery cell 1000. In addition, it is possible to reduce the labor costs, and ensures the reliability of the battery cell 1000.

According to an embodiment in a fourth aspect of the present disclosure, a battery pack includes the battery cell 1000 according to any embodiment in the above-mentioned third aspect of the present disclosure.

With the battery pack according to the embodiments of the present disclosure, by providing the battery cell 1000 according to any embodiment in the above-mentioned third aspect, it is possible to enhance safety performance of the battery pack, and ensure the reliability of the battery pack, thereby avoiding an occurrence of dangers.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "counterclockwise", "axial", "radial", "circumferential", etc., is based on the orientation or position relationship shown in the drawings, and is only for the convenience of describing the present disclosure and simplifying the description, rather than indicating or implying that the associated device or element must have a specific orientation, or be constructed and operated in a specific orientation, and therefore cannot be understood as a limitation on the present disclosure.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "a plurality of" means at least two, unless otherwise specifically defined.

In the present disclosure, unless otherwise clearly specified and limited, terms such as "installed", "mounted", "connected", "coupled", "fixed" and the like should be understood in a broad sense. For example, it may be a fixed connection or a detachable connection or connection as one piece; mechanical connection or electrical connection or communication; direct connection or indirect connection through an intermediate; internal communication of two components or the interaction relationship between two components. For those of ordinary skill in the art, the specific meaning of the above-mentioned terms in the present disclosure can be understood according to specific circumstances.

In the description of this specification, descriptions with reference to the terms "an embodiment", "some embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art can combine the different embodiments or examples and the features of the different embodiments or examples described in this specification without contradicting each other.

Although embodiments of the present disclosure have been illustrated and described, it is conceivable for those of ordinary skill in the art that various changes, modifications, replacements, and variations can be made to these embodiments without departing from the principles and spirit of the present disclosure. The scope of the present disclosure shall be defined by the claims as appended and their equivalents.

What is claimed is:

1. A preparation method of a current collector assembly, the current collector assembly comprising:
   a current collector comprising a plurality of tabs stacked in a thickness direction of the plurality of tabs; and
   a conductive connection assembly comprising a protection plate and a connection plate, at least one of the protection plate and the connection plate having at least one protrusion formed thereon, the preparation method comprising:
   abutting the connection plate or the protection plate having the at least one protrusion provided thereon against the plurality of tabs;
   generating a high-frequency vibration between the connection plate or the protection plate having the at least one protrusion provided thereon and the plurality of tabs; and
   piercing, by the at least one protrusion, the plurality of tabs sequentially through the high-frequency vibration,
   wherein a vibration frequency of the high-frequency vibration ranges from 15 KHz to 40 KHz.

2. The preparation method of the current collector assembly according to claim 1, wherein the vibration frequency of the high-frequency vibration is 20 KHz.

3. The preparation method of the current collector assembly according to claim 1, wherein an amplitude of the high-frequency vibration ranges from 5 μm to 100 μm.

4. The preparation method of the current collector assembly according to claim 1, wherein a vibration direction of the high-frequency vibration is parallel to a direction in which the at least one protrusion extends on a surface of the connection plate or on a surface of the protection plate.

5. The preparation method of the current collector assembly according to claim 1, wherein:
   the connection plate or the protection plate has a plurality of protrusions provided thereon; and
   a vibration direction of the high-frequency vibration is parallel to a direction in which the plurality of protrusions is arranged with a maximum density.

6. The preparation method of the current collector assembly according to claim 1, wherein the connection plate or the protection plate having the at least one protrusion provided thereon is abutted against the plurality of tabs with a pressure no less than 20N.

7. The preparation method of the current collector assembly according to claim 1, wherein the high-frequency vibration is a vibration generated by ultrasonic welding.

8. The preparation method of the current collector assembly according to claim 7, wherein a welding time of the ultrasonic welding is equal to or longer than 30 ms.

9. The preparation method of the current collector assembly according to claim 1, wherein:
   the protection plate is formed in a sheet-like shape;
   the at least one protrusion is formed on the connection plate; and
   the preparation method further comprises, prior to said abutting the connection plate having the at least one protrusion provided thereon against the plurality of tabs:
   covering the protection plate on a surface at one side of the plurality of tabs in the thickness direction; and
   arranging a connector at another side of the plurality of tabs in the thickness direction and positioning the at least one protrusion opposite to the plurality of tabs.

10. The preparation method of the current collector assembly according to claim 9, further comprising, subsequent to said piercing the plurality of tabs sequentially by the at least one protrusion through the high-frequency vibration:
    connecting the at least one protrusion to an inner surface of the protection plate facing the plurality of tabs or embedding the at least one protrusion within the protection plate through the high-frequency vibration.

11. The preparation method of the current collector assembly according to claim 1, wherein the current collector further comprises a plurality of electrode sheets stacked with each other, each of the plurality of electrode sheets comprising the tab, the tab comprising:
- a support insulation layer; and
- a first conductive layer and a second conductive layer covering surfaces on two sides of the support insulation layer in a thickness direction of the support insulation layer, respectively.

12. A current collector assembly, prepared by the preparation method of the current collector assembly according to claim 1.

13. A battery cell, comprising the current collector assembly according to claim 12.

14. A battery pack, comprising the battery cell according to claim 13.

* * * * *